US012667790B2

(12) United States Patent
Shin et al.

(10) Patent No.: US 12,667,790 B2
(45) Date of Patent: Jun. 30, 2026

(54) DISPLAY APPARATUS, ELECTRONIC DEVICE, AND OPERATING METHODS THEREOF

(71) Applicant: SAMSUNG ELECTRONICS CO., LTD., Suwon-si (KR)

(72) Inventors: Yongwoo Shin, Suwon-si (KR); Beomeun Kim, Suwon-si (KR); Sungchang Jang, Suwon-si (KR); Junhae Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 18/468,164

(22) Filed: Sep. 15, 2023

(65) Prior Publication Data

US 2024/0058708 A1 Feb. 22, 2024

Related U.S. Application Data

(63) Continuation of application No. PCT/KR2023/012416, filed on Aug. 22, 2023.

(30) Foreign Application Priority Data

Aug. 22, 2022 (KR) ........................ 10-2022-0104613

(51) Int. Cl.
*A63F 13/23* (2014.01)
*A63F 13/497* (2014.01)
(Continued)

(52) U.S. Cl.
CPC ............ *A63F 13/86* (2014.09); *A63F 13/497* (2014.09); *G06F 3/1454* (2013.01)

(58) Field of Classification Search
CPC .......... A63F 13/23; A63F 13/26; A63F 13/50; A63F 13/52; A63F 13/60; A63F 13/71;
(Continued)

(56) References Cited

U.S. PATENT DOCUMENTS

| | | | |
|---|---|---|---|
| 7,657,156 | B2 | 2/2010 | Yoo |
| 8,244,043 | B2 | 8/2012 | Chang et al. |

(Continued)

FOREIGN PATENT DOCUMENTS

| | | |
|---|---|---|
| JP | 6587722 B2 | 9/2019 |
| JP | 2020-504855 | 2/2020 |

(Continued)

OTHER PUBLICATIONS

Search Report and Written Opinion dated Nov. 23, 2023 issued in International Patent Application No. PCT/KR2023/012416.
(Continued)

*Primary Examiner* — Omkar A Deodhar
(74) *Attorney, Agent, or Firm* — Nixon & Vanderhye P.C.

(57) ABSTRACT

Provided are a display apparatus and an operating method thereof, and an electronic device and an operating method thereof. A display apparatus includes a display, a communication unit comprising communication circuitry, a memory in which one or more instructions are stored, and a processor configured to execute the one or more instructions stored in the memory to: identify whether content displayed on the display is sharable content, control the communication unit to broadcast a signal including state information indicating that the content is sharable content according to the identifying, control the communication unit to receive a content sharing request for sharing the content from an electronic device based on the broadcast signal, and control the communication unit to transmit at least part of the content output to the display to the electronic device, in response to the content sharing request.

20 Claims, 23 Drawing Sheets

10

(51) Int. Cl.
    *A63F 13/86*       (2014.01)
    *G06F 3/14*       (2006.01)

(58) Field of Classification Search
    CPC .. A63F 13/86; A63F 13/497; A63F 2300/203;
                A63F 2300/30; A63F 2300/403; A63F
                             2300/552; G06F 3/1454
    See application file for complete search history.

(56)            References Cited

U.S. PATENT DOCUMENTS

| | | | |
|---|---|---|---|
| 8,781,152 B2 | 7/2014 | Momeyer et al. | |
| 8,805,089 B2 | 8/2014 | Chang et al. | |
| 9,306,992 B2 | 4/2016 | Praveenkumar et al. | |
| 10,754,540 B2 | 8/2020 | Ye et al. | |
| 10,824,594 B2 | 11/2020 | Guest | |
| 10,979,466 B2 | 4/2021 | Christmas et al. | |
| 11,431,909 B2 | 8/2022 | Lee et al. | |
| 2014/0002389 A1 | 1/2014 | Kim et al. | |
| 2014/0362293 A1* | 12/2014 | Bakar | H04N 21/43615 |
| | | | 348/552 |
| 2014/0365611 A1* | 12/2014 | Praveenkumar | H04L 65/61 |
| | | | 709/219 |
| 2015/0381704 A1 | 12/2015 | Dadu et al. | |
| 2017/0086014 A1 | 3/2017 | Hwang et al. | |
| 2018/0295175 A1* | 10/2018 | Smith | H04L 65/65 |
| 2019/0118099 A1* | 4/2019 | Payzer | H04L 65/4015 |
| 2019/0272140 A1* | 9/2019 | Sarfi | G09G 5/14 |
| 2020/0117331 A1* | 4/2020 | Ye | G06F 3/0482 |
| 2021/0136129 A1* | 5/2021 | Ponnusamy | H04L 63/107 |
| 2021/0339150 A1* | 11/2021 | Knoppert | A63F 13/215 |
| 2023/0076093 A1 | 3/2023 | Kim et al. | |

FOREIGN PATENT DOCUMENTS

| | | |
|---|---|---|
| JP | 2020-522151 | 7/2020 |
| JP | 2021-522568 | 8/2021 |
| KR | 101128793 B1 | 3/2012 |
| KR | 10-2013-0060280 | 6/2013 |
| KR | 101295304 B1 | 8/2013 |
| KR | 10-2013-0129366 | 11/2013 |
| KR | 10-2016-0032198 | 3/2016 |
| KR | 10-2016-0146965 | 12/2016 |
| KR | 101702273 B1 | 2/2017 |
| KR | 20200100918 A | 8/2020 |
| KR | 102328121 B1 | 11/2021 |

OTHER PUBLICATIONS

Extended European Search Report dated Jun. 2, 2025 for EP Application No. 23857699.5.

\* cited by examiner (RELATED ART)

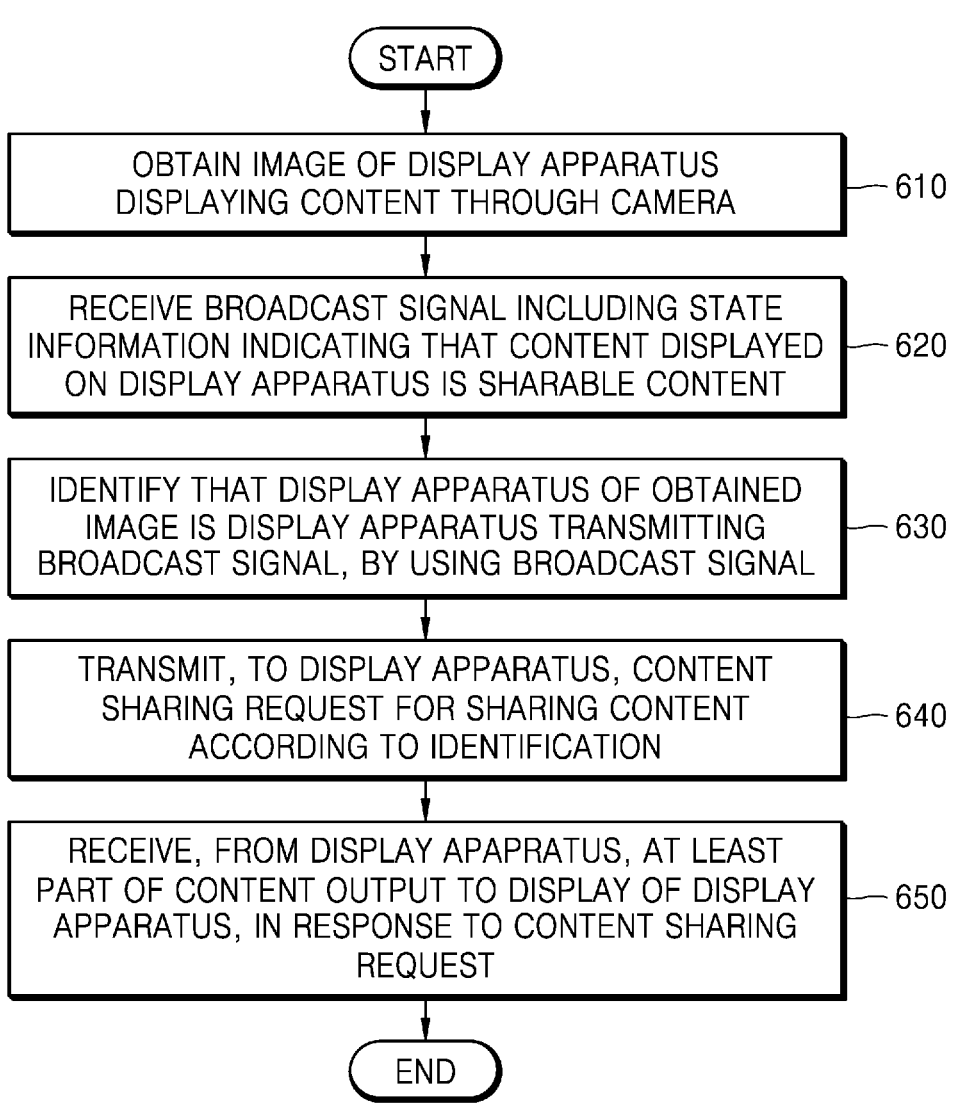

START

OBTAIN IMAGE OF DISPLAY APPARATUS
DISPLAYING CONTENT THROUGH CAMERA — 610

RECEIVE BROADCAST SIGNAL INCLUDING STATE
INFORMATION INDICATING THAT CONTENT DISPLAYED — 620
ON DISPLAY APPARATUS IS SHARABLE CONTENT

IDENTIFY THAT DISPLAY APPARATUS OF OBTAINED
IMAGE IS DISPLAY APPARATUS TRANSMITTING — 630
BROADCAST SIGNAL, BY USING BROADCAST SIGNAL

TRANSMIT, TO DISPLAY APPARATUS, CONTENT
SHARING REQUEST FOR SHARING CONTENT — 640
ACCORDING TO IDENTIFICATION

RECEIVE, FROM DISPLAY APAPRATUS, AT LEAST
PART OF CONTENT OUTPUT TO DISPLAY OF DISPLAY — 650
APPARATUS, IN RESPONSE TO CONTENT SHARING
REQUEST

END

CAPTURE 1110
RECORD 1120
EXIT 1130

200

SELECT RECORD

RECORDED CONTENT

SHARED CONTENT

DISPLAY APPARATUS, ELECTRONIC DEVICE, AND OPERATING METHODS THEREOF

CROSS-REFERENCE TO RELATED APPLICATIONS

This application is a continuation of International Application No. PCT/KR2023/012416 designating the United States, filed on Aug. 22, 2023, in the Korean Intellectual Property Receiving Office and claiming priority to Korean Patent Application No. 10-2022-0104613, filed on Aug. 22, 2022, in the Korean Intellectual Property Office, the disclosures of each of which are incorporated by reference herein in their entireties.

BACKGROUND

Field

The disclosure relates to a display apparatus, an electronic device, and operating methods of the display apparatus and the electronic device, and for example, to a display apparatus that enables an electronic device to effectively capture content displayed on the display apparatus and an operating method of the display apparatus.

Description of Related Art

Users may consume various content by, for example, watching a movie or playing a game, using a display apparatus. As such, users may want to capture or record a desired scene from content while watching the content using a display apparatus, and upload the captured or recorded scene using social network service applications.

However, because most of content displayed on a display apparatus has a rights-related issue such as copyright, most display apparatuses may not provide a capturing function or a recording function. Also, although a user may capture content displayed on a display apparatus by photographing the display apparatus using a camera of a mobile device separate from the display apparatus, it may be difficult to clearly capture or record only the content desired by the user.

SUMMARY

Embodiments of the disclosure provide a display apparatus, an electronic device, and operating methods of the display apparatus and the electronic device, so as to effectively capture or record content displayed on the display apparatus.

A display apparatus according to an example embodiment of the disclosure includes: a display, a communication unit comprising communication circuitry, a memory in which one or more instructions are stored, and a processor configured to execute the one or more instructions stored in the memory. According to an example embodiment of the disclosure, the processor may be configured to identify whether content displayed on the display is sharable content, by executing the one or more instructions. According to an example embodiment of the disclosure, the processor may be configured to control the communication unit to broadcast a signal including state information indicating that the content is sharable content as the content displayed on the display is identified as sharable content, by executing the one or more instructions. According to an example embodiment of the disclosure, the processor may be configured to receive a content sharing request for sharing the content from an electronic device based on the broadcast signal, by executing the one or more instructions. According to an example embodiment of the disclosure, the processor may be configured to control the communication unit to transmit at least part of the content output to the display to the electronic device, in response to the content sharing request, by executing the one or more instructions.

An electronic device according to an example embodiment of the disclosure includes: a display, a communication unit comprising communication circuitry, a memory in which one or more instructions are stored, and a processor configured to execute the one or more instructions stored in the memory. According to an example embodiment of the disclosure, the processor may be configured to obtain an image of a display apparatus displaying content, through a camera of the electronic device, by executing the one or more instructions. According to an example embodiment of the disclosure, the processor may be configured to receive a broadcast signal including state information indicating that the content displayed on the display apparatus is sharable content, by executing the one or more instructions. According to an example embodiment of the disclosure, the processor may be configured to identify whether the display apparatus of the obtained image is the display apparatus transmitting the broadcast signal, based on the broadcast signal, by executing the one or more instructions. According to an example embodiment of the disclosure, the processor may be configured to transmit a content sharing request for sharing the content to the display apparatus based on determining that the display apparatus of the obtained image is the display apparatus transmitting the broadcast signal, by executing the one or more instructions. According to an example embodiment of the disclosure, the processor may be configured to receive, from the display apparatus, at least part of the content output to a display of the display apparatus, in response to the content sharing request, by executing the one or more instructions.

A method of operating a display apparatus according to an example embodiment of the disclosure includes identifying whether content displayed on a display is sharable content. The method of operating the display apparatus according to an example embodiment of the disclosure includes broadcasting a signal including state information indicating that the content is sharable content according to the identifying. The method of operating the display apparatus according to an example embodiment of the disclosure includes receiving a content sharing request for sharing the content from an electronic device based on the broadcast signal. The method of operating the display apparatus according to an example embodiment of the disclosure includes transmitting at least part of the content output to the display to the electronic device, in response to the content sharing request.

A method of operating an electronic device according to an example embodiment of the disclosure includes obtaining an image of a display apparatus displaying content, through a camera of the electronic device. The method of operating the electronic device according to an example embodiment of the disclosure includes receiving a broadcast signal including state information indicating that the content displayed on the display apparatus is sharable content. The method of operating the electronic device according to an example embodiment of the disclosure includes identifying whether the display apparatus of the obtained image is the display apparatus transmitting the broadcast signal, based on the broadcast signal. The method operating of the electronic device according to an example embodiment of the disclosure includes transmitting a content sharing request for sharing the content to the display apparatus according to the identifying. The method of operating the electronic device according to an example embodiment of the disclosure includes receiving, from the display apparatus, at least part of the content output to a display of the display apparatus, in response to the content sharing request.

A non-transitory computer-readable recording medium according to an example embodiment of the disclosure has recorded thereon at least one program executable by a processor of a display apparatus to perform a method of operating the display apparatus.

A non-transitory computer-readable recording medium according to an example embodiment of the disclosure has recorded thereon at least one program executable by a processor of an electronic device to perform a method of operating the electronic device.

According to various example embodiments of the disclosure, when a user attempts to capture content displayed on a display apparatus, the content may be transmitted to an electronic device using content sharing technology so that the user may capture or record the content with higher quality.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a block diagram illustrating an example configuration of a display apparatus and an electronic device, according to various embodiments;

FIG. 6 is a flowchart illustrating an example method of operating an electronic device to share content displayed on a display apparatus, according to various embodiments;

FIG. 9 is a diagram illustrating an example where a display apparatus provides identification response information according to an apparatus checking request from an electronic device, according to various embodiments;

4

Figure 12:
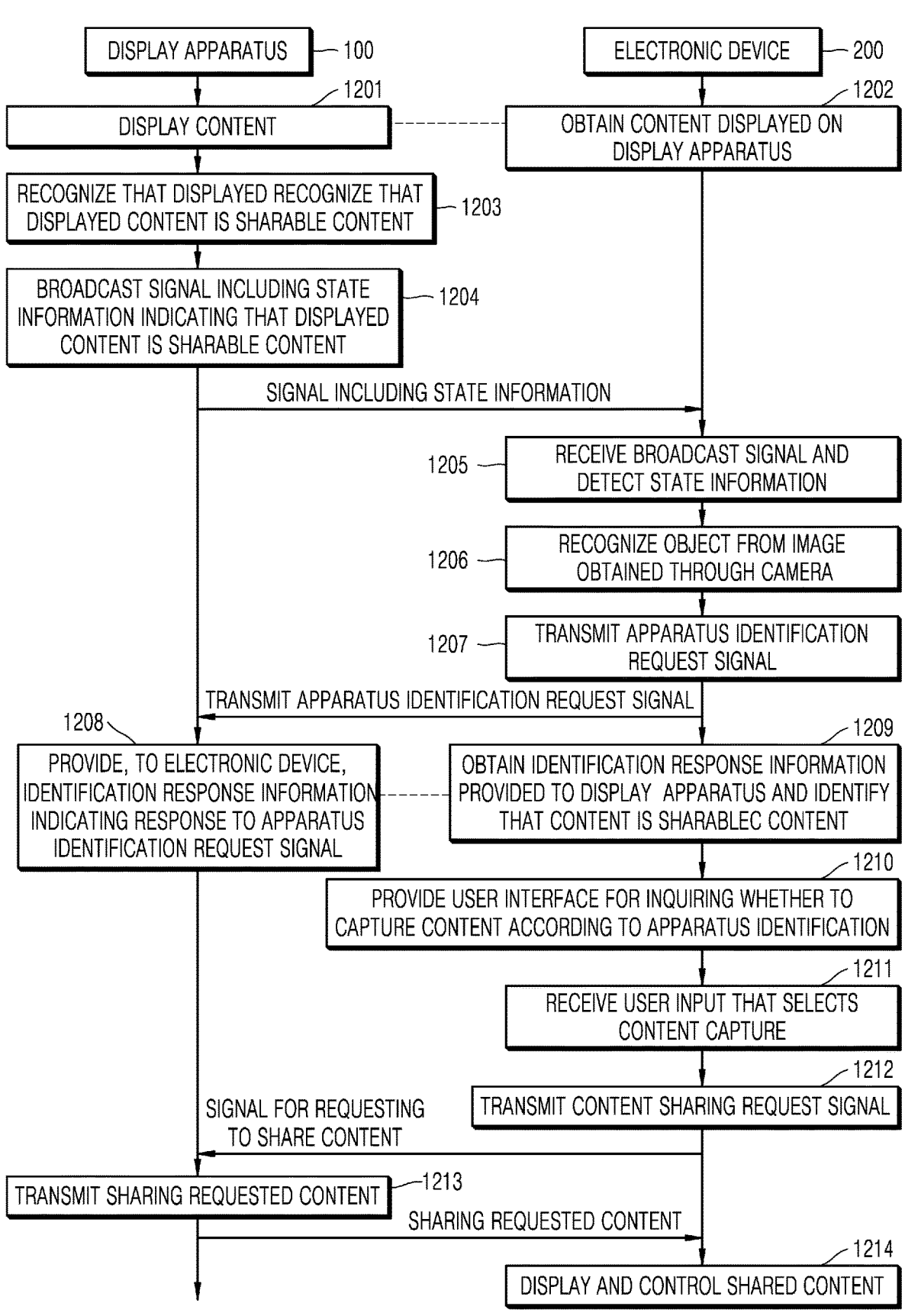
Figure 13:
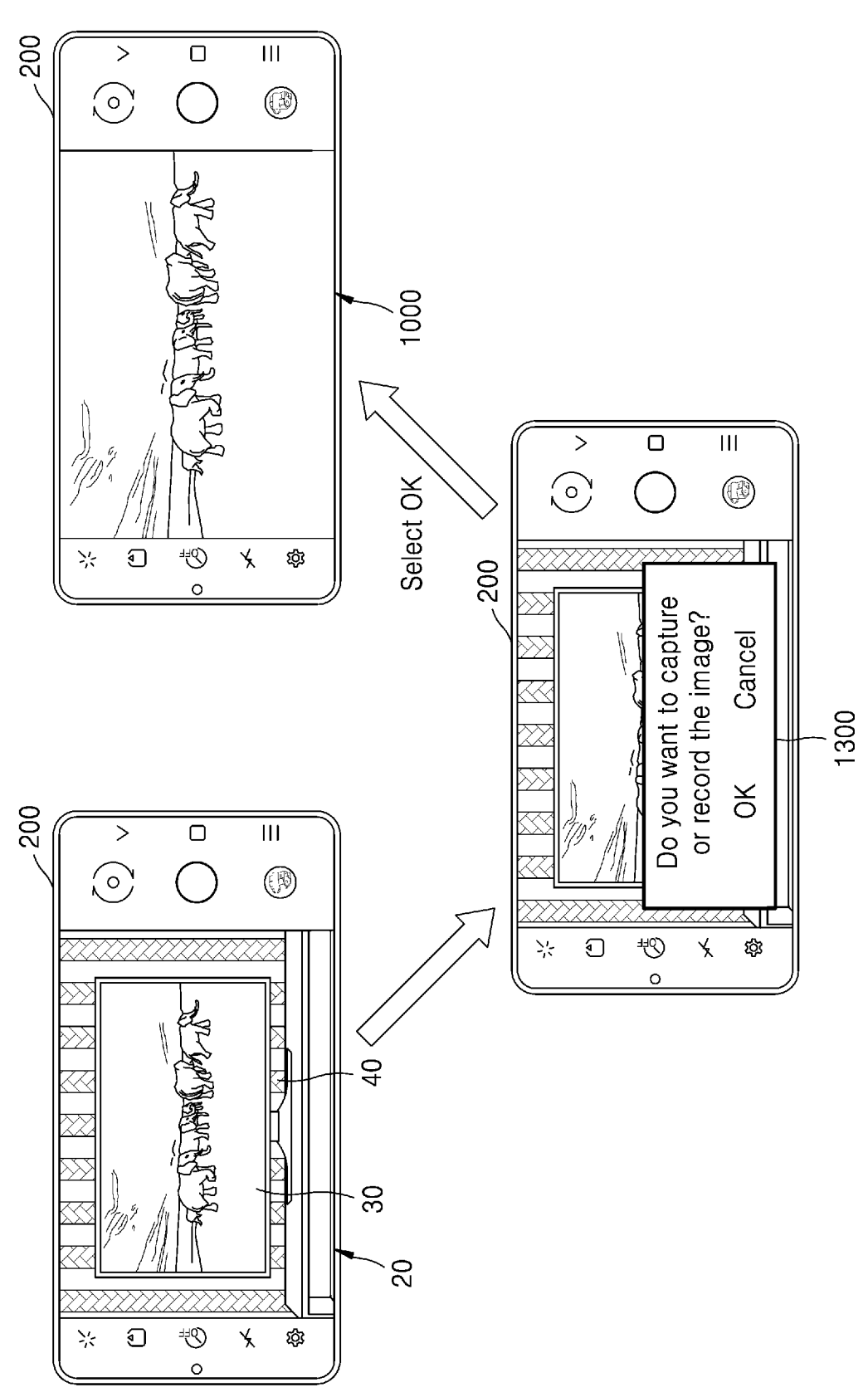
Figure 14:
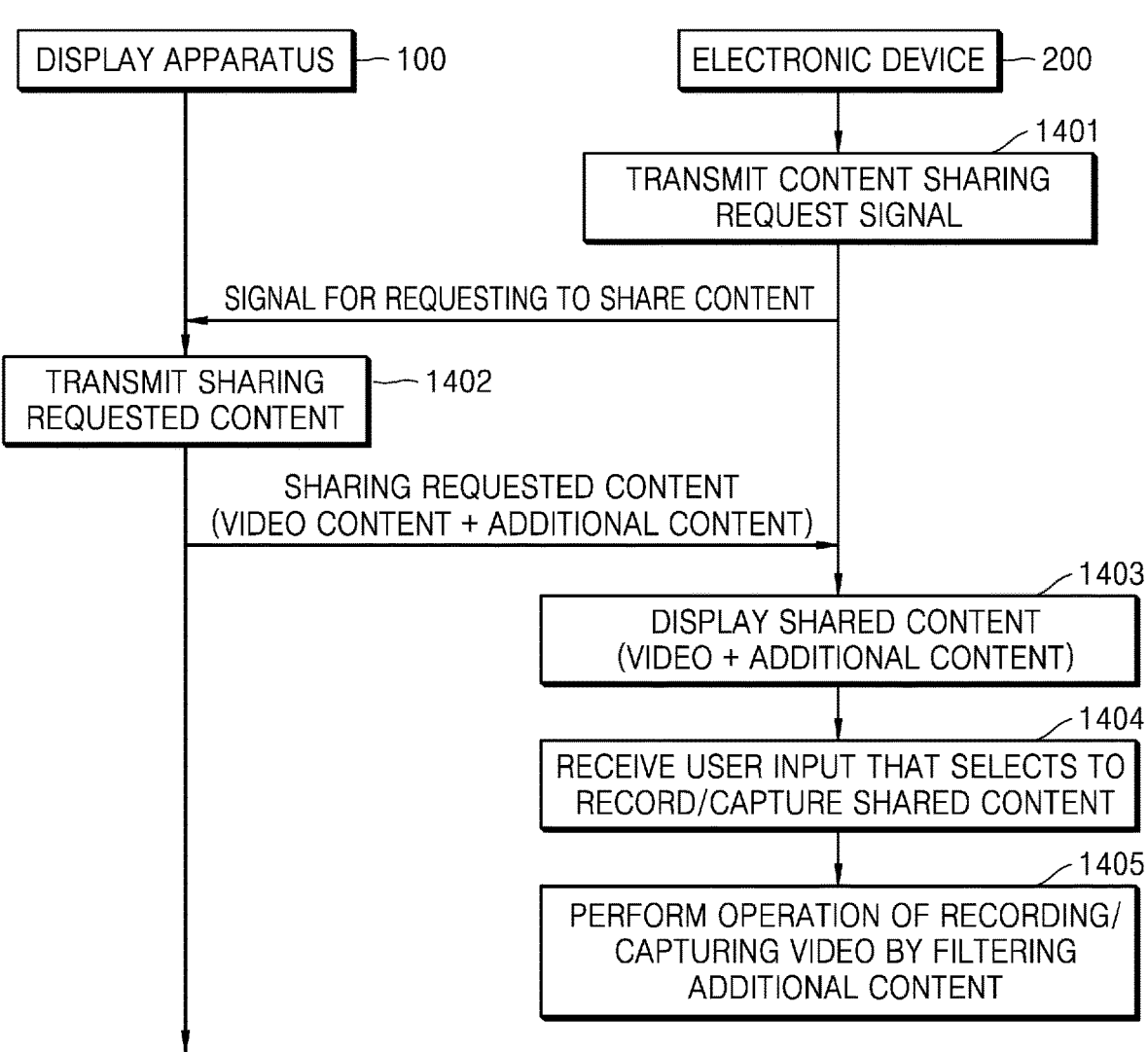
Figure 16:
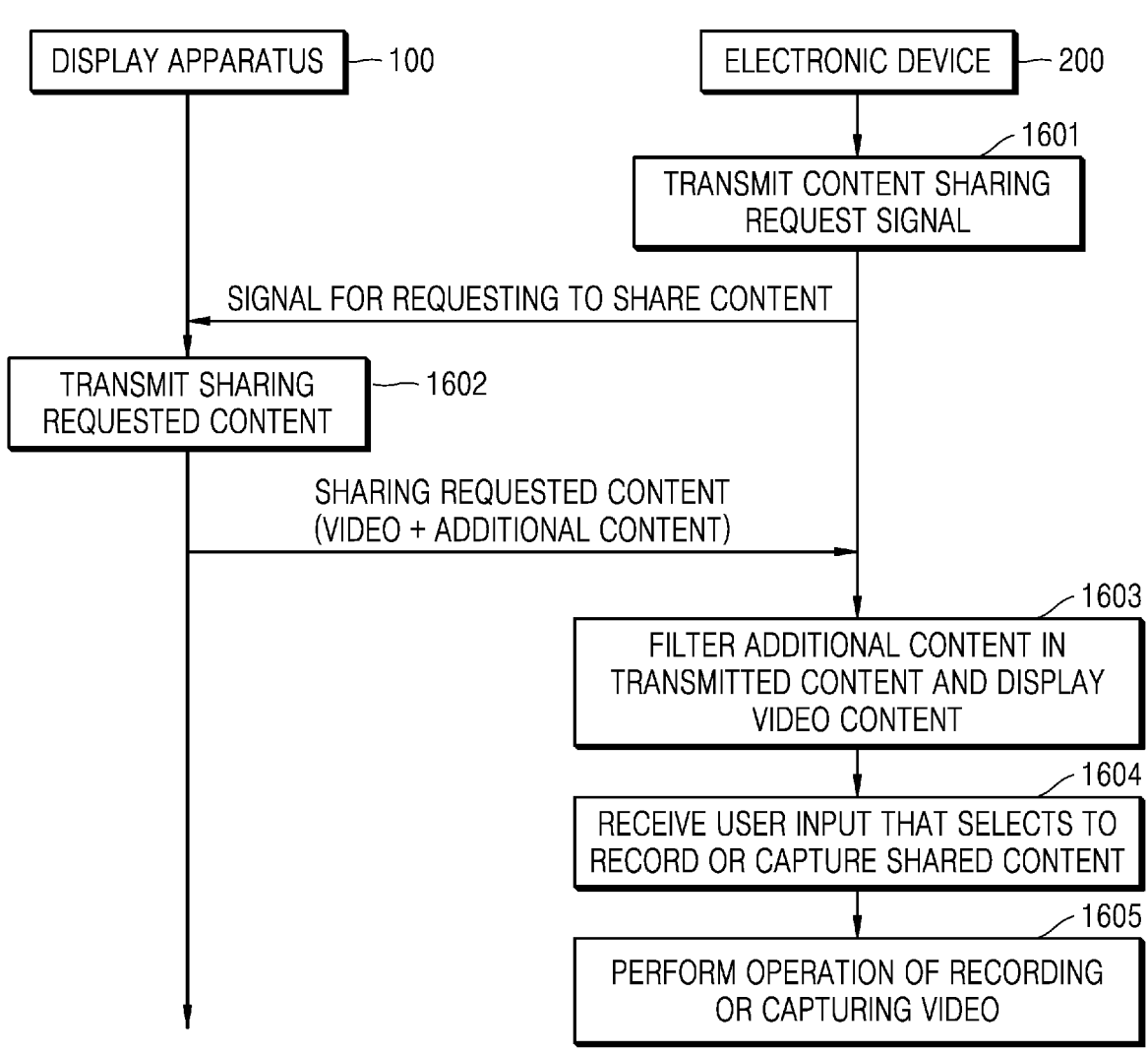
Figure 17:
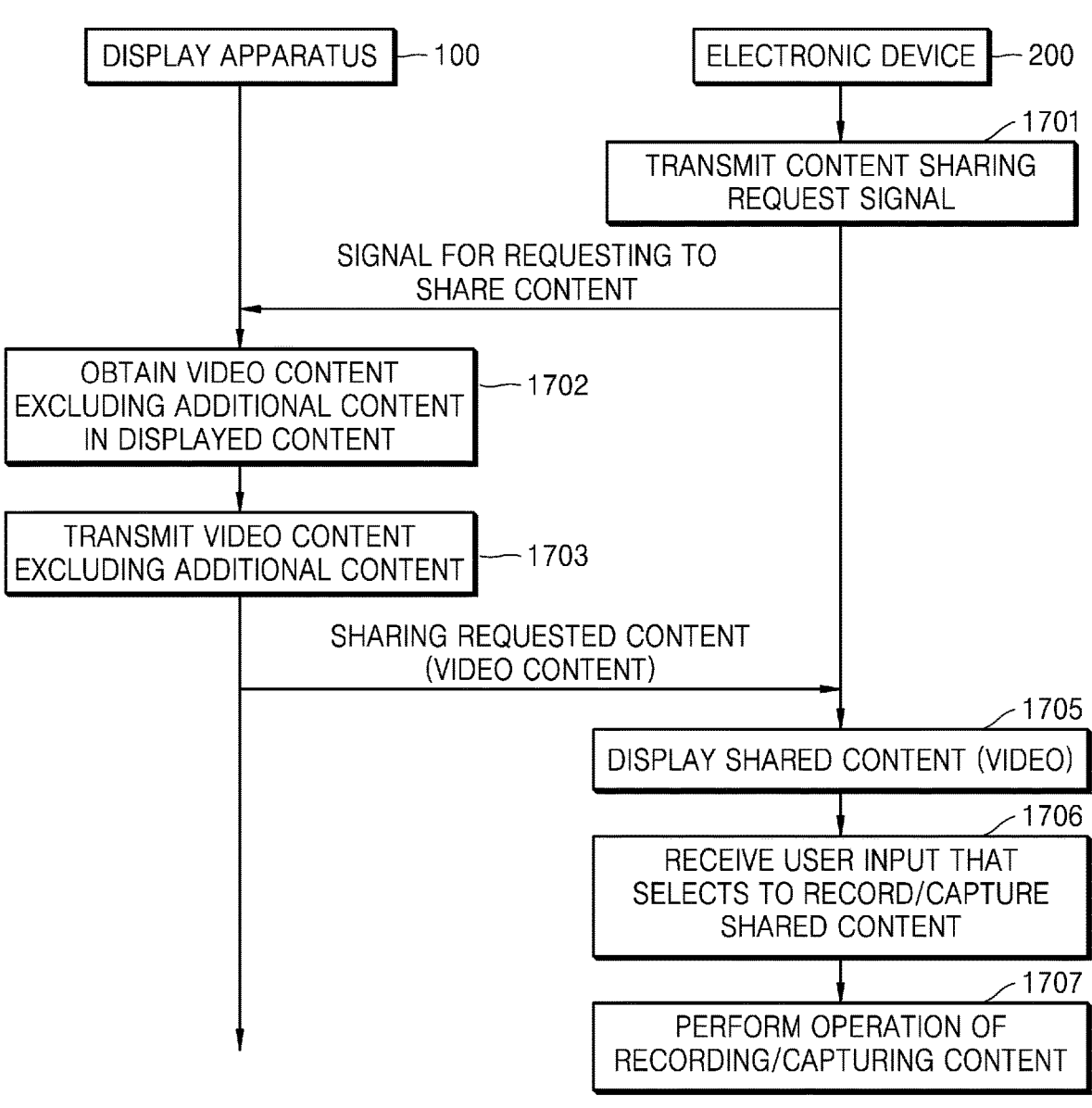
Figure 19:
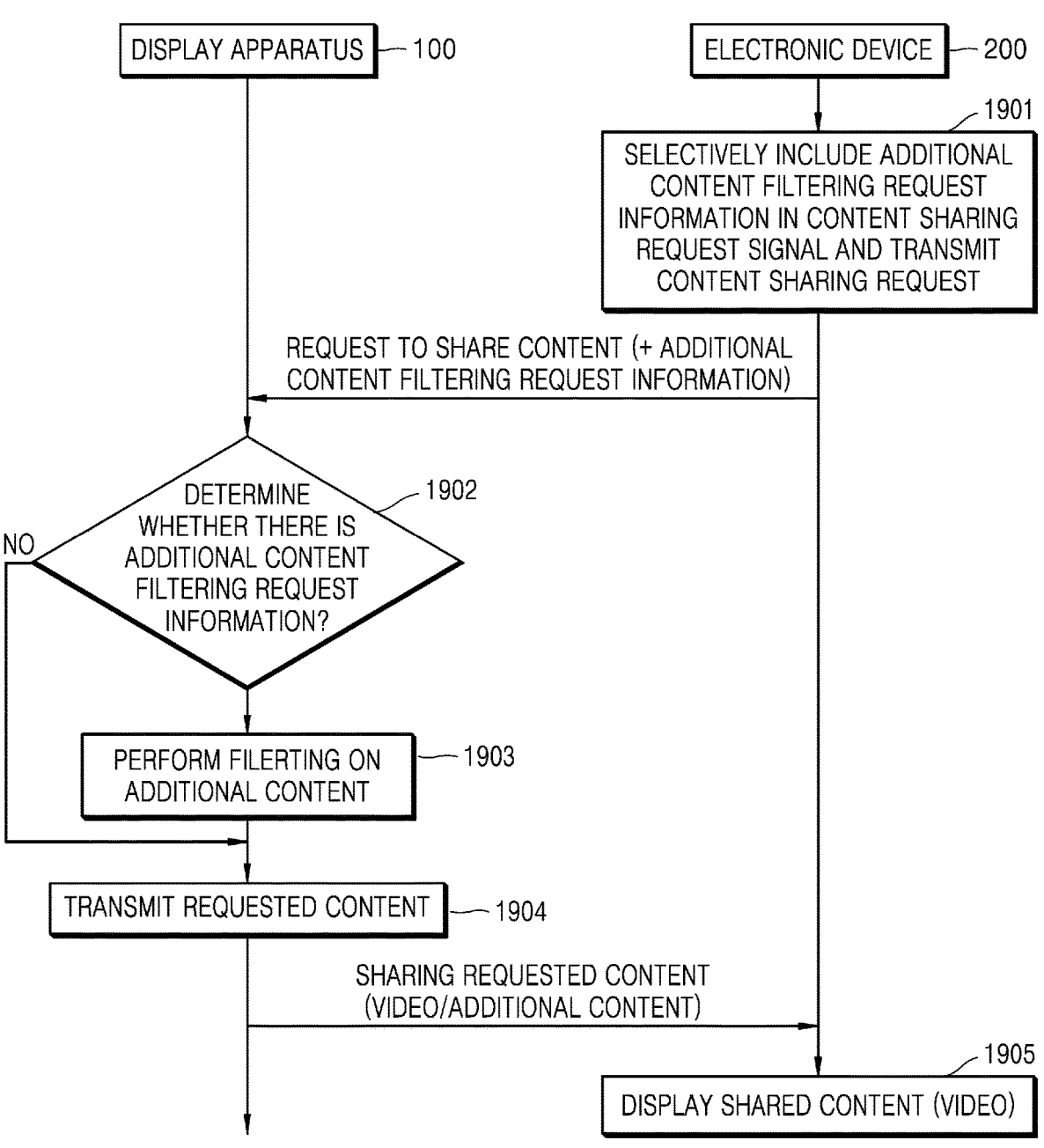
Figure 20:
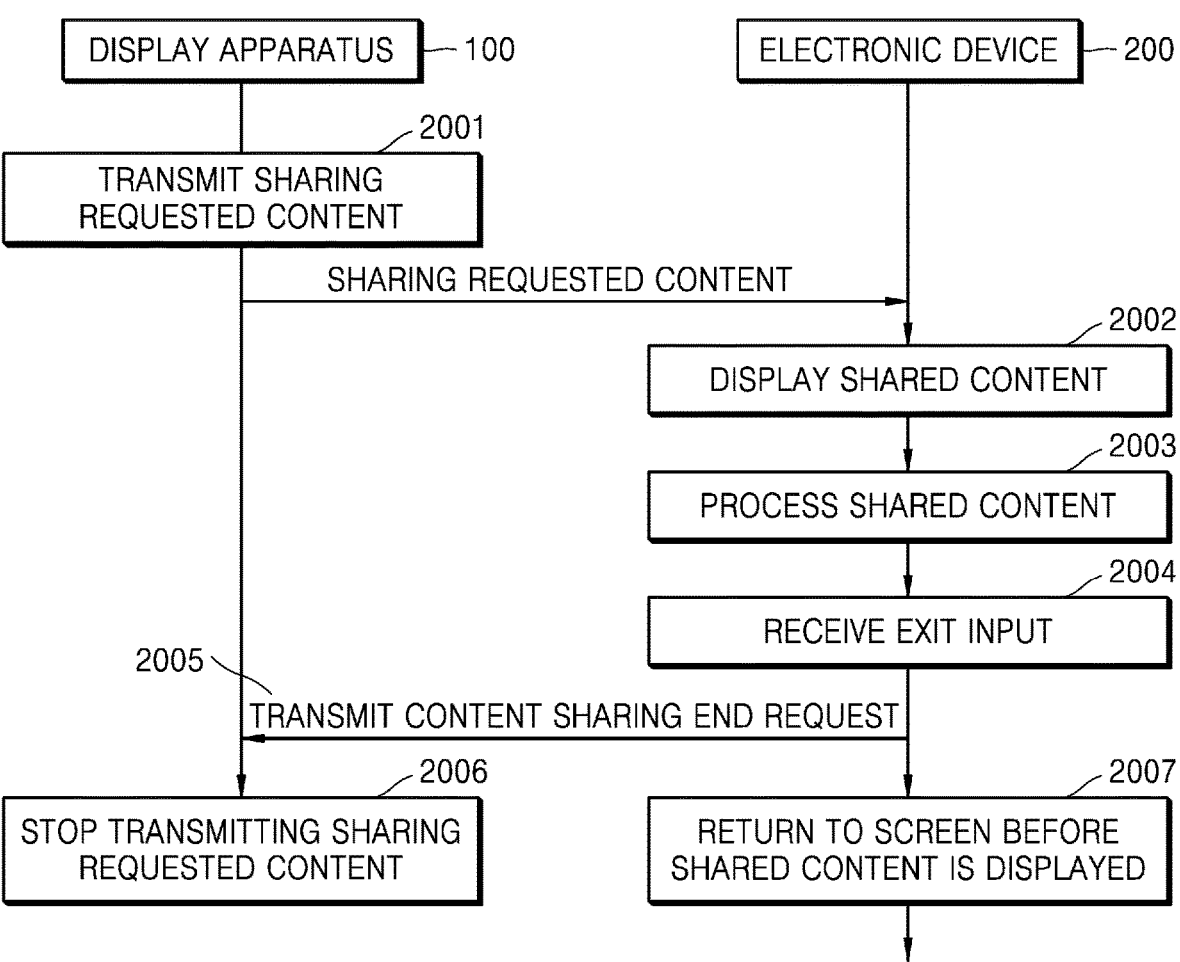
Figure 21:
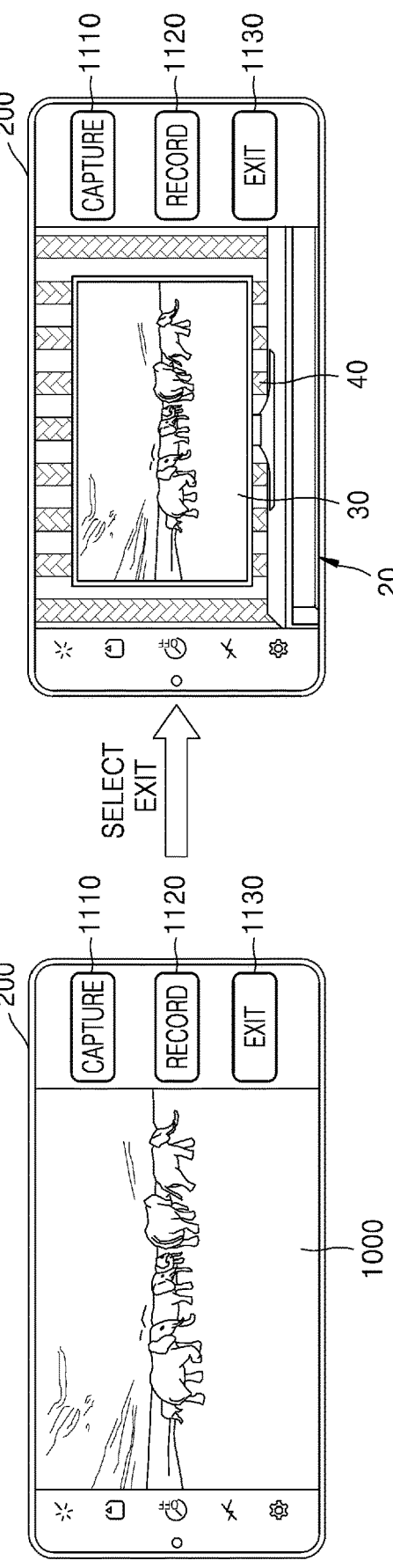
Figure 22:
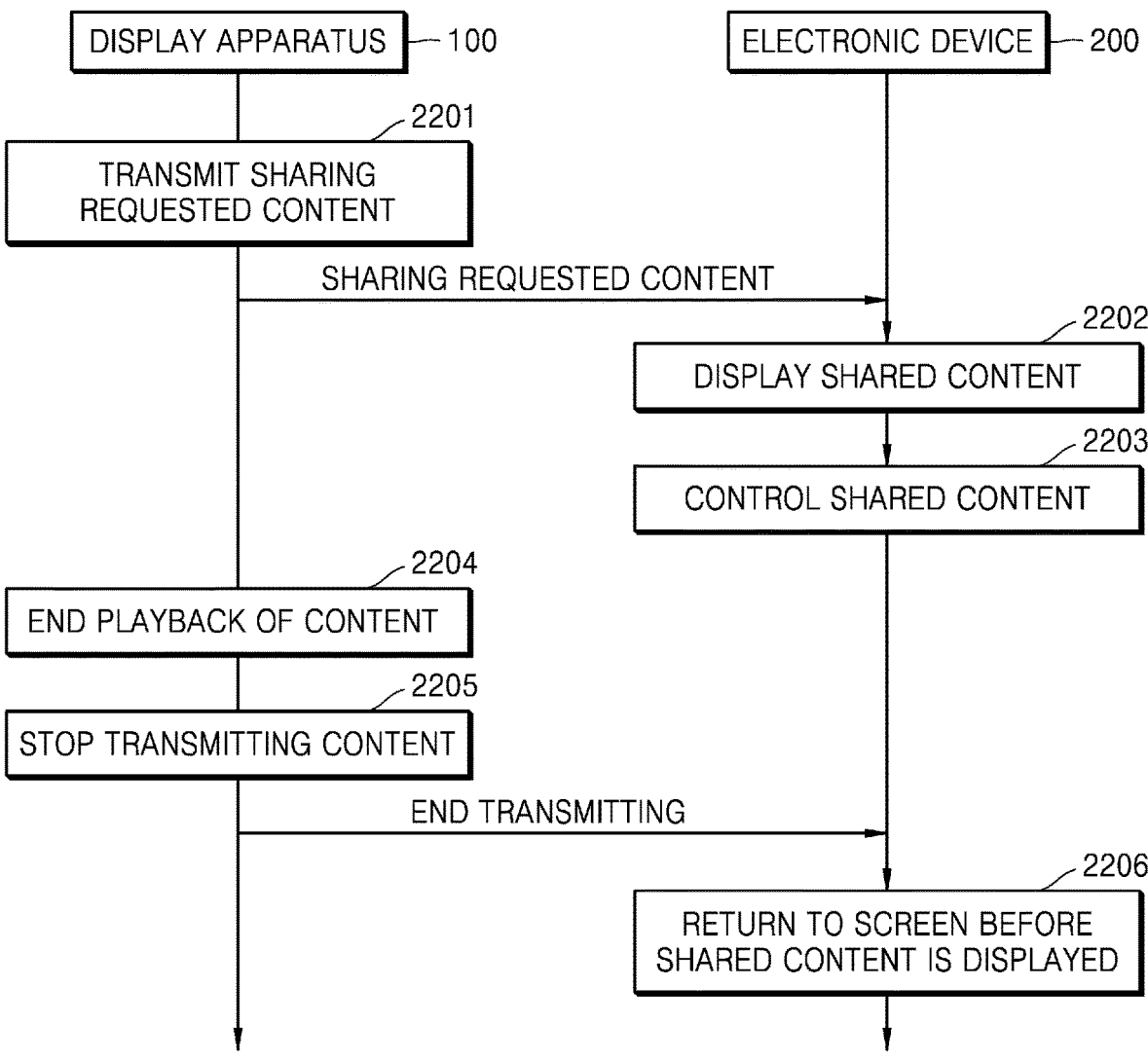

FIG. 12 is a signal flow diagram illustrating example methods of operating a display apparatus and an electronic device to share content, according to various embodiments;

FIG. 13 is a diagram illustrating an example process in which an electronic device checks a user's intention to capture after checking a display apparatus, according to various embodiments;

FIG. 14 is a signal flow diagram illustrating an example method by which an electronic device receives and processes shared content, according to various embodiments;

Figure 15:
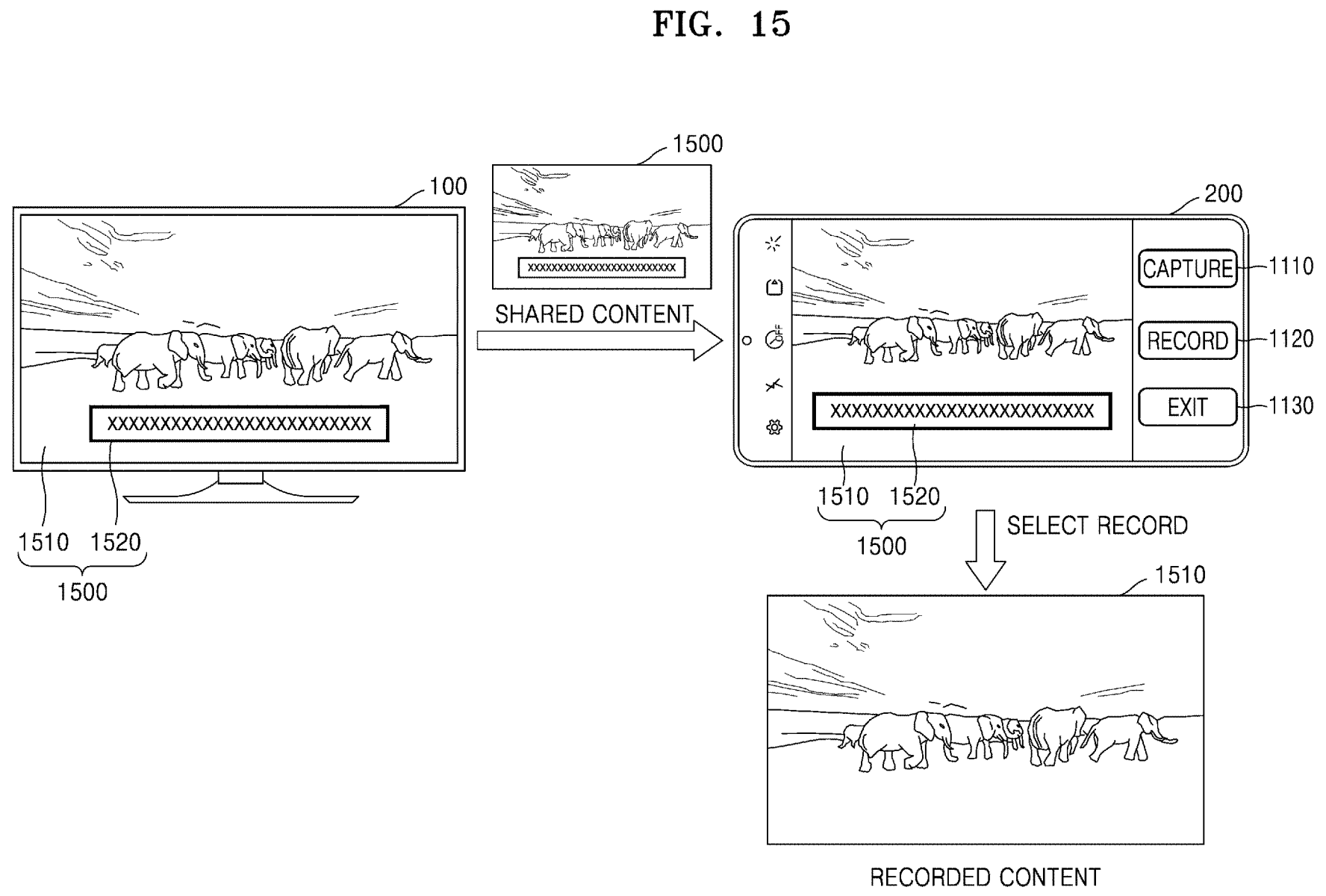

FIG. 15 is a diagram illustrating an example where an electronic device performs filtering on additional content, according to various embodiments;

FIG. 16 is a signal flow diagram illustrating an example method by which an electronic device receives and processes shared content, according to various embodiments;

FIG. 17 is a signal flow diagram illustrating an example method by which an electronic device receives and processes shared content, according to various embodiments;

Figure 18:
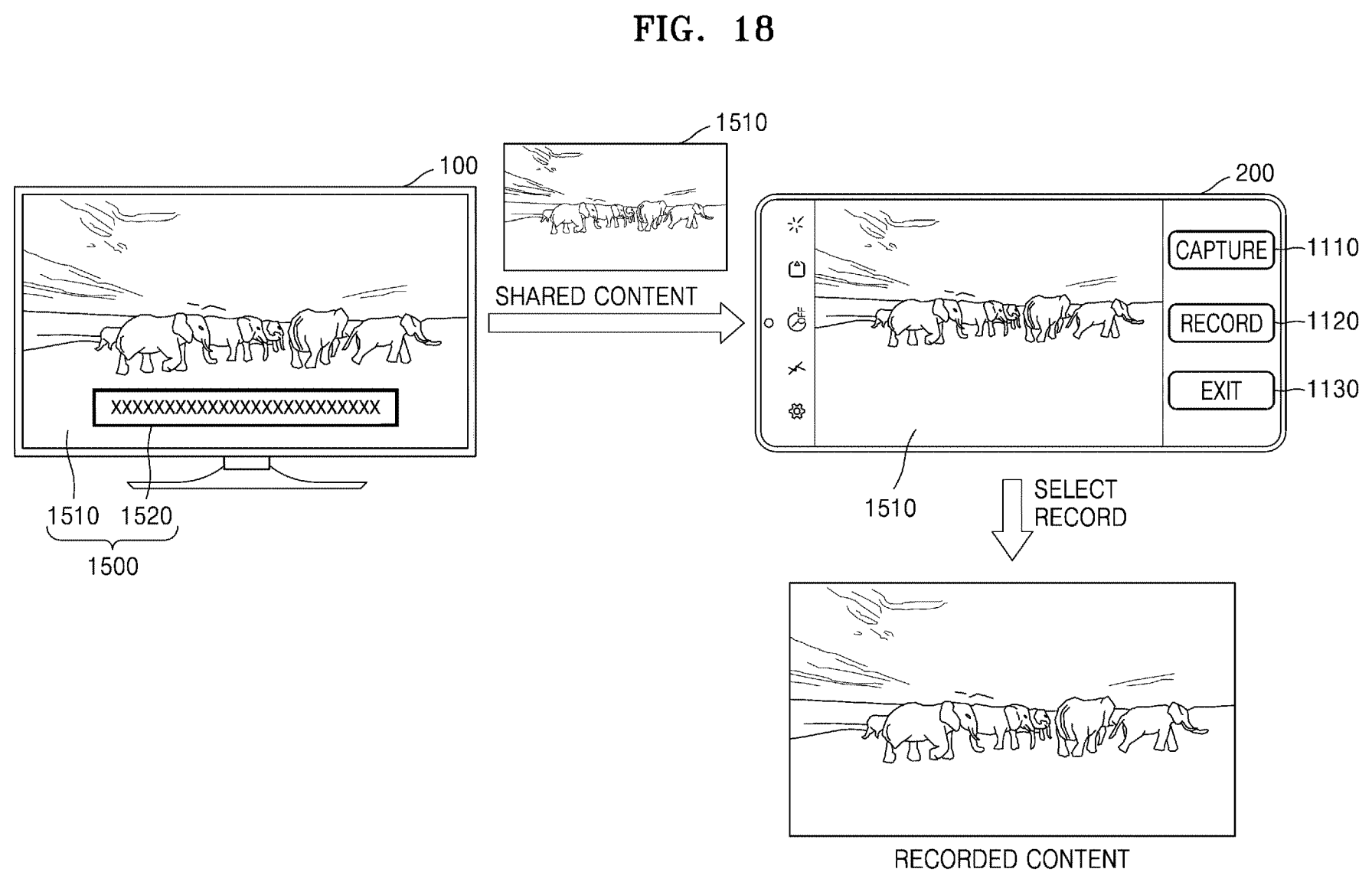

FIG. 18 is a diagram illustrating an example where a display apparatus performs filtering on additional content, according to various embodiments;

FIG. 19 is a signal flow diagram illustrating an example method by which an electronic device transmits a content sharing request together with an additional content filtering request to a display apparatus, according to various embodiments;

FIG. 20 is a signal flow diagram illustrating an example method of operating an electronic device when an end command is received while an electronic device displays shared content, according to various embodiments;

FIG. 21 is a diagram illustrating an example method by which an electronic device ends displaying shared content, according to various embodiments;

FIG. 22 is a signal flow diagram illustrating an example method of operating an electronic device when playback of shared content in a display apparatus ends while an electronic device displays the shared content, according to various embodiments; and FIG. 23 is a diagram illustrating an example method by which an electronic device ends displaying shared content, according to various embodiments.

DETAILED DESCRIPTION

Throughout the disclosure, the expression "at least one of a, b or c" indicates only a, only b, only c, both a and b, both a and c, both b and c, all of a, b, and c, or variations thereof.

The terms used herein will be briefly described, and the disclosure will be described in greater detail with reference to the accompanying drawings.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily selected, and in this case, these terms are defined in detail below. Accordingly, the specific terms used herein should be defined based on the unique meanings thereof and the whole context of the disclosure.

It will be understood that when a certain part "includes" a certain component, the part does not exclude another component but may further include another component, unless the context clearly dictates otherwise. Also, the term such as " . . . unit" or " . . . module" refers to a unit that performs at least one function or operation, and the unit may be implemented as hardware or software or as a combination of hardware and software.

The disclosure will now be described more fully with reference to the accompanying drawings. However, the disclosure may be embodied in many different forms and is not limited to the embodiments of the disclosure set forth herein. For clarity, portions irrelevant to the descriptions of the disclosure may be omitted in the drawings, and like components are denoted by like reference numerals throughout the disclosure.

The term "user" used herein refers to a person who controls a function or an operation of a computing device or an electronic device using a control device, and may include a viewer, a manager, or an installation engineer.

Figure 1:
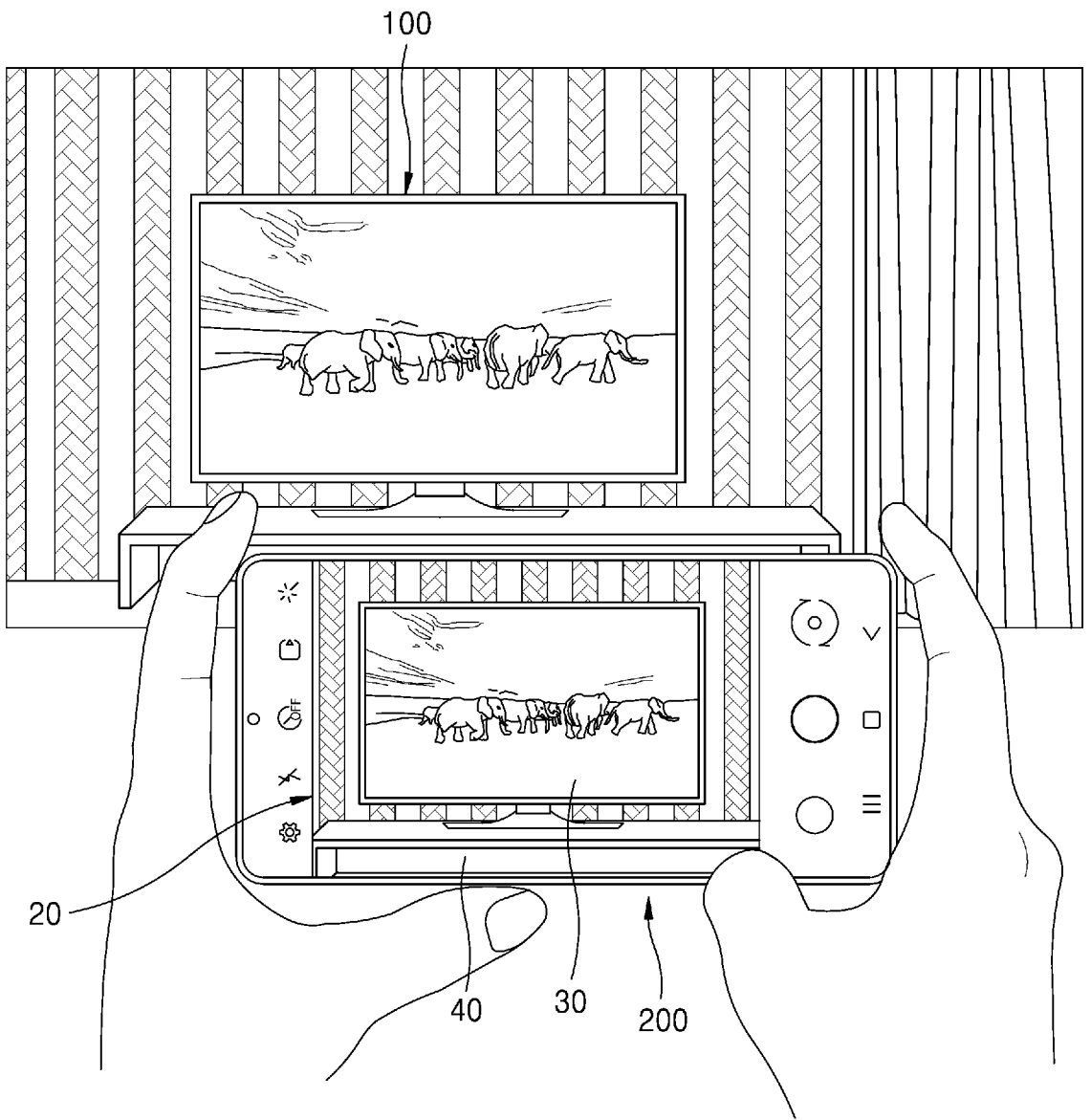
FIG. 1 is a diagram illustrating an example where a mobile device captures content displayed on a display apparatus using a camera, according to the related art.

FIG. 1 is a diagram illustrating an example where a mobile device captures content display on a display apparatus using a camera, according to the related art.

Referring to FIG. 1, a display apparatus 100 may display content requested by a user. The content displayed by the display apparatus 100 may include any of various content such as video content or game content. For example, while the display apparatus 100 displays game content, the user may want to capture a specific portion of the displayed game content. In this case, the user may capture a screen on which the game content is displayed by capturing an image of the display apparatus 100 using a camera of an electronic device 200.

However, when the user directly captures the image of the display apparatus 100 using the electronic device 200 in this way, it may be difficult to effectively obtain a scene of the game content desired by the user. For example, as shown in FIG. 1, a screen 20 captured by the mobile device 200 may include not only an image 30 of the screen of the display apparatus 100 but also an image of an environment around the display apparatus 100, for example, an image 40 of a wall. Also, when the screen of the display apparatus 100 is captured in this way, the screen may be distorted or image quality may be uneven, and lighting reflected on the screen of the display apparatus 100 or even the user himself/herself may also be captured. Accordingly, it may be unsatisfactory for the user to use the obtained image of the game content in a social network service system.

Figure 2:
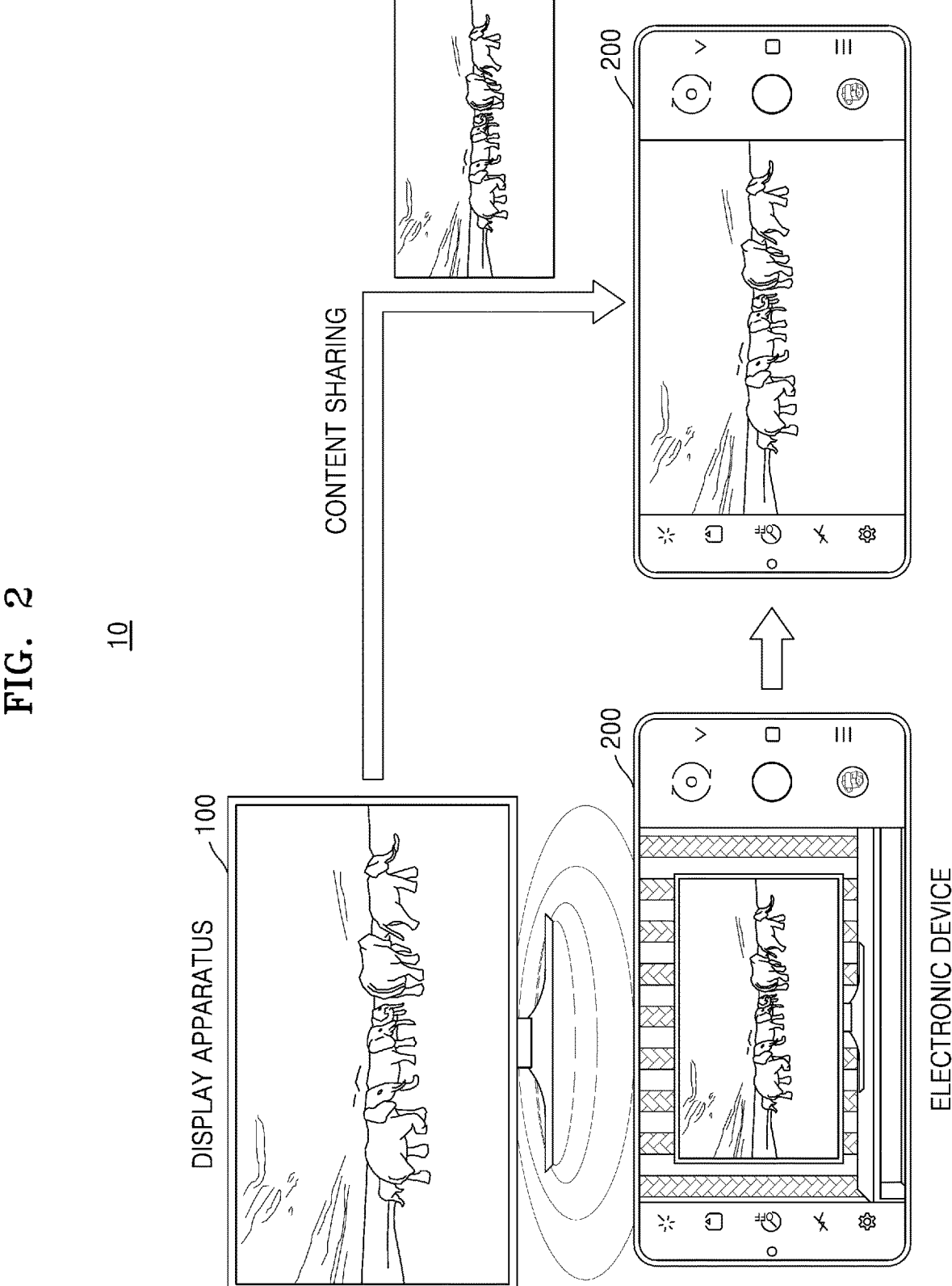
FIG. 2 is a diagram illustrating an example system for effectively capturing, by an electronic device, content displayed on a display apparatus, according to various embodiments.

FIG. 2 is a diagram illustrating an example system for effectively capturing, by an electronic device, content displayed on a display apparatus, according to various embodiments.

Referring to FIG. 2, a system 10 may include the display apparatus 100 and the electronic device 200.

The display apparatus 100 may output or display content received from various sources. The display apparatus 100 may include any of various types of electronic devices capable of receiving and outputting content such as, for example, and without limitation, a network TV, a smart TV, an Internet TV, a web TV, an IPTV, a PC, or the like. The display apparatus 100 may be referred to as a display apparatus because it receives and displays content, and may also be referred to as a content output device, an electronic device, or a computing device.

The electronic device 200 may display content received from the display apparatus 100, and may capture or record and store a portion of the received content requested by a user. The electronic device 200 may include a camera to capture an image including the display apparatus 100. The electronic device 200 may include any of various types of electronic devices capable of executing an application and displaying content according to the user's request. The electronic device 200 may be referred to as an electronic device to be distinguished from the display apparatus 100, and may also be referred to as a portable device, a personal mobile device, a smart device, a computing device, or a multimedia device.

According to an embodiment of the disclosure, the display apparatus 100 may display content, and may identify that the displayed content is sharable content. The display apparatus 100 may identify that displayed content is sharable content based on attribute information of the content. When there is no copyright issue in displayed content based on attribute information of the content, the display apparatus 100 may identify that the content is sharable content. Content with no copyright issue may include content free from a copyright issue, such as content for which copyright itself does not exists, content for which copyright has expired, or content for which copyright is limited.

According to an embodiment of the disclosure, when it is identified that displayed content is sharable content, the display apparatus 100 may broadcast a signal including state information indicating that the displayed content is sharable content. For example, the display apparatus 100 may broadcast a signal including state information indicating that content displayed on the display apparatus 100 is sharable content, to an unspecified number of peripheral devices through, for example, BLE communication.

According to an embodiment of the disclosure, the user may operate a camera mode to capture an image displayed on a screen of the display apparatus 100 using the electronic device 200 to capture content displayed on the display apparatus 100. While the electronic device 200 operates in the camera mode, the electronic device 200 may receive a signal broadcast from the display apparatus 100.

According to an embodiment of the disclosure, as the electronic device 200 receives, from the display apparatus 100, a signal including state information that content displayed on the display apparatus 100 is sharable content, the electronic device 200 may transmit a content sharing request to the display apparatus 100.

According to an embodiment of the disclosure, the electronic device 200 may transmit, to the display apparatus 100, a request to identify that (e.g., determine whether) the display apparatus transmitting the signal including the state information is the same as the display apparatus displaying the content, and may transmit a content sharing request to the display apparatus 100 when response information to the request is checked.

According to an embodiment of the disclosure, when the checking of the display apparatus 100 is completed in response to the request to identify the display apparatus 100, the electronic device 200 may automatically transmit a content sharing request to the display apparatus 100 or may transmit a content sharing request to the display apparatus 100 after checking the user's intention to capture the content.

According to an embodiment of the disclosure, when the display apparatus 100 receives the content sharing request from the electronic device 200, the display apparatus 100 may transmit the content displayed on the display apparatus 100 to the electronic device 200 using content sharing technology. According to an embodiment of the disclosure, when the content displayed on the screen of the display apparatus 100 further includes a graphical user interface in addition to video content, the display apparatus 100 may transmit both the video content and the graphical user interface to the electronic device 200 at once, or may filter the graphical user interface and may transmit only the video content to the electronic device 200. When there is the content sharing request, a user of the electronic device 200 may not want to capture content other than the video content, that is, content such as the graphical user interface, and thus, in this case, it is preferable to filter and transmit content such as the graphical user interface.

According to an embodiment of the disclosure, the electronic device 200 may receive the content displayed on the display apparatus 100 from the display apparatus 100 using content sharing technology. The electronic device 200 may perform an operation of, for example, capturing or recording part of the received content, while displaying the received content on a display of the electronic device 200.

According to various example embodiments of the disclosure, when the user wants to capture content displayed on the display apparatus 100 using the electronic device 200, the content displayed on the display apparatus 100 is shared with the electronic device 200, and thus, the electronic device may obtain the content displayed on the display apparatus 100 without degrading the quality of the content and may use the obtained content in various ways for personal use.

Figure 3:
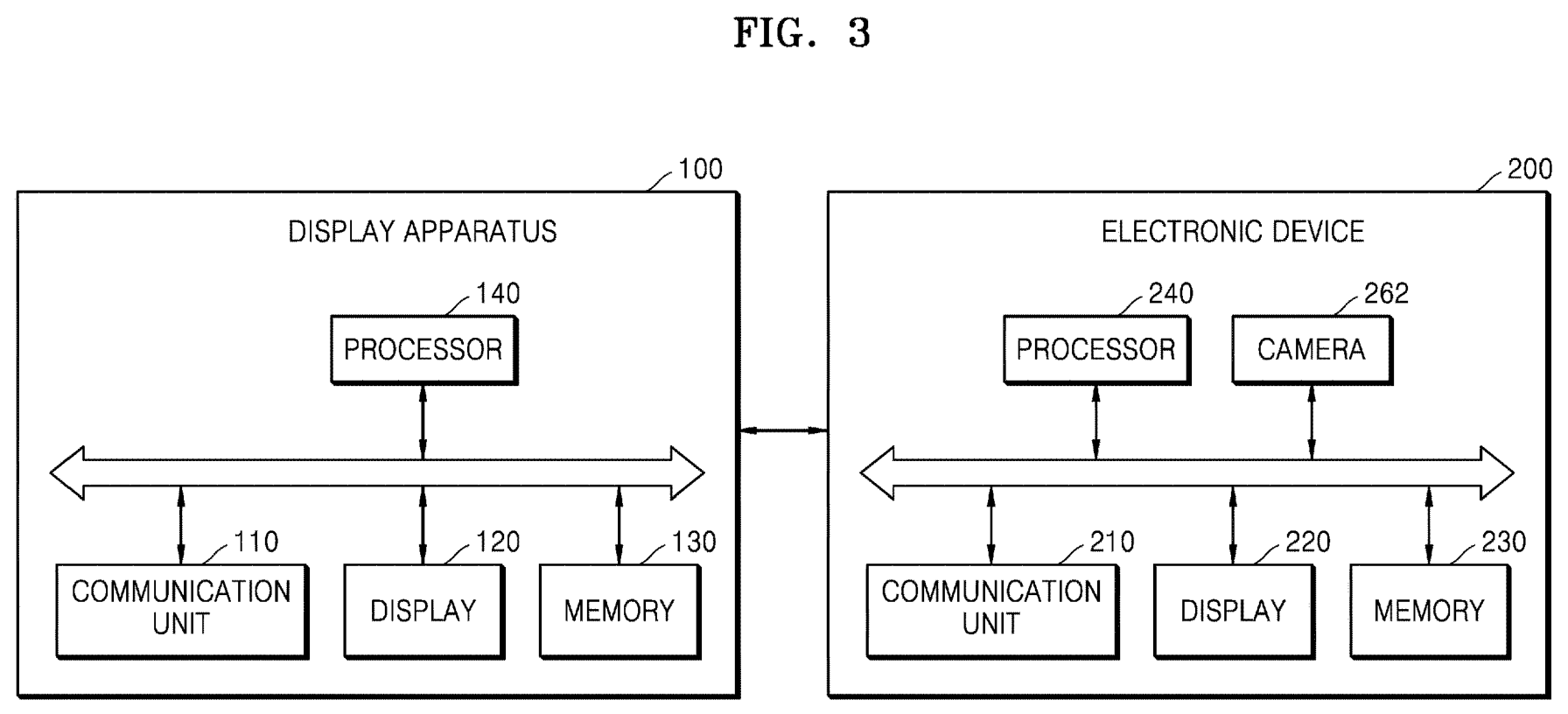

FIG. 3 is a block diagram illustrating an example configuration of a display apparatus and an electronic device, according to various embodiments.

Referring to FIG. 3, a system may include the display apparatus 100 and the electronic device 200 that may be connected to each other through a communication network.

The display apparatus 100 may be an apparatus for displaying an image or data according to a user's request, and may include a communication unit (e.g., including communication circuitry) 110, a display 120, a memory 130, and a processor (e.g., including processing circuitry) 140.

The communication unit 110 may include various communication circuitry included in one or more modules that enable wireless communication between the display apparatus 100 and a wireless communication system or between the display apparatus 100 and a network in which another device is located. According to an embodiment of the disclosure, the communication unit 110 may perform communication with the electronic device 200 according to short-range communication technology.

The display 120 may output an image or data processed by the display apparatus 100.

The memory 130 may store a program for processing and control of the processor 140, and may store data input to the display apparatus 100 or output from the display apparatus 100. Also, the memory 130 may store data required to operate the display apparatus 100.

The memory 130 may include at least one type of storage medium of a flash memory type storage unit, a hard disk type storage unit, a multimedia card micro type storage unit, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

The processor 140 may include various processing circuitry and controls an overall operation of the display apparatus 100. For example, the processor 140 may cause the display apparatus 100 to perform a function, by executing one or more instructions stored in the memory 130.

In an embodiment of the disclosure, the processor 140 may control operations of the display apparatus to be performed, by storing one or more instructions in an internal memory provided therein and executing the one or more instructions stored in the internal memory provided therein. That is, the processor 140 may perform a specified operation by executing at least one instruction or program stored in the internal memory provided in the processor 140 or in the memory 130.

According to an embodiment of the disclosure, the processor 140 may identify that content displayed on the display 120 is sharable content, by executing one or more instructions stored in the memory 130.

According to an embodiment of the disclosure, as the content displayed on the display 120 is identified as sharable content, the processor 140 may control the communication unit 110 to broadcast a signal including state information indicating that the content is sharable content, by executing one or more instructions stored in the memory 130.

According to an embodiment of the disclosure, the processor 140 may receive a content sharing request for sharing the content from the electronic device 200 based on the broadcast signal, by executing one or more instructions stored in the memory 130.

According to an embodiment of the disclosure, the processor 140 may control the communication unit 110 to transmit at least part of the content output to the display 120 to the electronic device, in response to the content sharing request received from the electronic device 200, by executing one or more instructions stored in the memory 130.

According to an embodiment of the disclosure, the processor 140 may identify that the content is the sharable content by detecting that the content is game content, by executing one or more instructions stored in the memory 130.

According to an embodiment of the disclosure, the processor 140 may receive a identification request signal for identifying the display apparatus from the electronic device in response to the broadcast signal, by executing one or more instructions stored in the memory 130.

According to an embodiment of the disclosure, the processor 140 may provide identification response information indicating a response together with the content, in response to the identification request signal, and may receive the content sharing request for sharing the content from the electronic device in response to the identification response information, by executing one or more instructions stored in the memory 130.

According to an embodiment of the disclosure, the processor 140 may embed the identification response information in the content and may invisibly provide the identification response information, or may provide the identification response information to be visibly displayed on the content, by executing one or more instructions stored in the memory 130.

According to an embodiment of the disclosure, the content sharing request may include a first type sharing request and a second type sharing request.

According to an embodiment of the disclosure, when the first type sharing request is received, the processor 140 may control additional content other than the content in data output to the display to be filtered and the content to be transmitted to the electronic device, by executing one or more instructions stored in the memory 130.

According to an embodiment of the disclosure, when the second type sharing request is received, the processor 140 may control both the content and the additional content output to the display to be transmitted to the electronic device, by executing one or more instructions stored in the memory 130.

Components of the block diagram may be integrated, added, or omitted according to specifications of the display apparatus 100 that is actually implemented. For example, when necessary, two or more components may be combined into one component, or one component may be sub-divided into two or more components. Also, a function performed in each block is intended to describe embodiments of the disclosure, and its detailed operations or devices do not limit the scope of the disclosure.

The electronic device 200 may include a communication unit (e.g., including communication circuitry) 210, a display 220, a memory 230, a camera 262, and a processor (e.g., including processing circuitry) 240. However, the electronic device 200 may include more elements than those illustrated in FIG. 3, and the disclosure is not limited thereto.

The communication unit 210 may include various communication circuitry and communicate with an external device using any of various communication technologies.

The display 220 may output an image or data processed by the electronic device 200.

The camera 262 may capture an image (e.g., consecutive frames) corresponding to a motion of the user including a gesture or an external environment within a camera recognition range.

The memory 230 may store a program for processing and control of the processor 240, and may store data input to the electronic device 200 or output from the electronic device 200.

The memory 230 may include at least one type of storage medium of a flash memory type storage unit, a hard disk type storage unit, a multimedia card micro type storage unit, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

The processor 240 may include various processing circuitry and controls an overall operation of the electronic device 200. For example, the processor 240 may cause the electronic device 200 to perform a function, by executing one or more instructions stored in the memory 230.

In an embodiment of the disclosure, the processor 240 may control the above operations to be performed, by storing one or more instructions stored in an internal memory provided therein and executing the one or more instructions stored in the internal memory provided therein. That is, the processor 240 may perform a specified operation, by executing at least one instruction or program stored in the internal memory provided in the processor 240 or in the memory 230.

According to an embodiment of the disclosure, the processor 240 may obtain, through the camera 262, an image of the display apparatus that displays content, by executing one or more instructions stored in the memory 230.

According to an embodiment of the disclosure, the processor 240 may control the communication unit 210 to receive a broadcast signal including state information that the content displayed on the display apparatus is sharable content, by executing one or more instructions stored in the memory 230.

According to an embodiment of the disclosure, the processor 240 may identify that (e.g., determine whether) the display apparatus of the obtained image is the display apparatus that transmits the broadcast signal, based on the broadcast signal, by executing one or more instructions stored in the memory 230.

According to an embodiment of the disclosure, the processor 240 may control the communication unit 210 to transmit, to the display apparatus, a content sharing request for sharing the content according to the checking, by executing one or more instructions stored in the memory 230.

According to an embodiment of the disclosure, the processor 240 may control the communication unit 210 to receive, from the display apparatus, at least part of the content output to a display of the display apparatus, in response to the content sharing request, by executing one or more instructions stored in the memory 230.

According to an embodiment of the disclosure, the processor 240 may detect an object representing the display apparatus 100 from the obtained image, based on the broadcast signal, by executing one or more instructions stored in the memory 230.

According to an embodiment of the disclosure, the processor 240 may transmit, to the display apparatus, a identification request signal for identifying the display apparatus according to the detection of the object, by executing one or more instructions stored in the memory 230.

According to an embodiment of the disclosure, the processor 240 may check the display apparatus by detecting identification response information from the object representing the display apparatus in response to the identification request signal, by executing one or more instructions stored in the memory 230.

According to an embodiment of the disclosure, the processor 240 may detect the identification response information provided by being invisibly embedded in the content or may detect the identification response information provided by being visibly displayed on the content, by executing one or more instructions stored in the memory 230.

According to an embodiment of the disclosure, the processor 240 may control the communication unit 210 to transmit a first type sharing request to filter additional content other than the content in data output to the display and transmit the content to the electronic device, or a second type sharing request to transmit both the content and the additional content output to the display to the electronic device, by executing one or more instructions stored in the memory 230.

According to an embodiment of the disclosure, the processor 240 may control the communication unit 210 to automatically transmit the content sharing request to the display apparatus according to the checking of the display apparatus, by executing one or more instructions stored in the memory 230.

According to an embodiment of the disclosure, the processor 240 may control the communication unit 210 to provide a user interface for selecting photographing of the content according to the checking of the display apparatus, and as a user input that selects photographing of the content is received according to the user interface, to transmit the content sharing request for sharing the content to the display apparatus, by executing one or more instructions stored in the memory 230.

According to an embodiment of the disclosure, the processor 240 may display, on the display, the content received from the display apparatus according to the content sharing request, and may record or capture the content displayed on the display according to a user input, by executing one or more instructions stored in the memory 230.

According to an embodiment of the disclosure, the electronic device 200 may further include a user interface. According to an embodiment of the disclosure, the user interface may be any type of interface for receiving a user input. According to an embodiment of the disclosure, for example, the user interface may include operation buttons arranged on a part of the electronic device 200 to receive the user's input, a light receiving unit that may receive an input from a remote control device, and a microphone that may receive a touch input or the user's voice utterance input when the display is a touch sensitive display.

The electronic device 200 may be any type of device that includes a processor and a memory and performs a function. The electronic device 200 may be a fixed or portable device. Examples of the electronic device 200 may include various electronic devices such as a computer (e.g., a desktop, a laptop, or a tablet), a television, a set-top box, a smartphone, a cellular phone, a game player, a music player, a video player, a medical equipment, and a home appliance.

Components of the block diagram may be integrated, added, or omitted according to specifications of the electronic device 200 that is actually implemented. For example, when necessary, two or more components may be combined into one component, or one component may be sub-divided into two or more components. Also, a function performed in each block is intended to describe embodiments of the disclosure, and its detailed operations or devices do not limit the scope of the disclosure.

Figure 4:
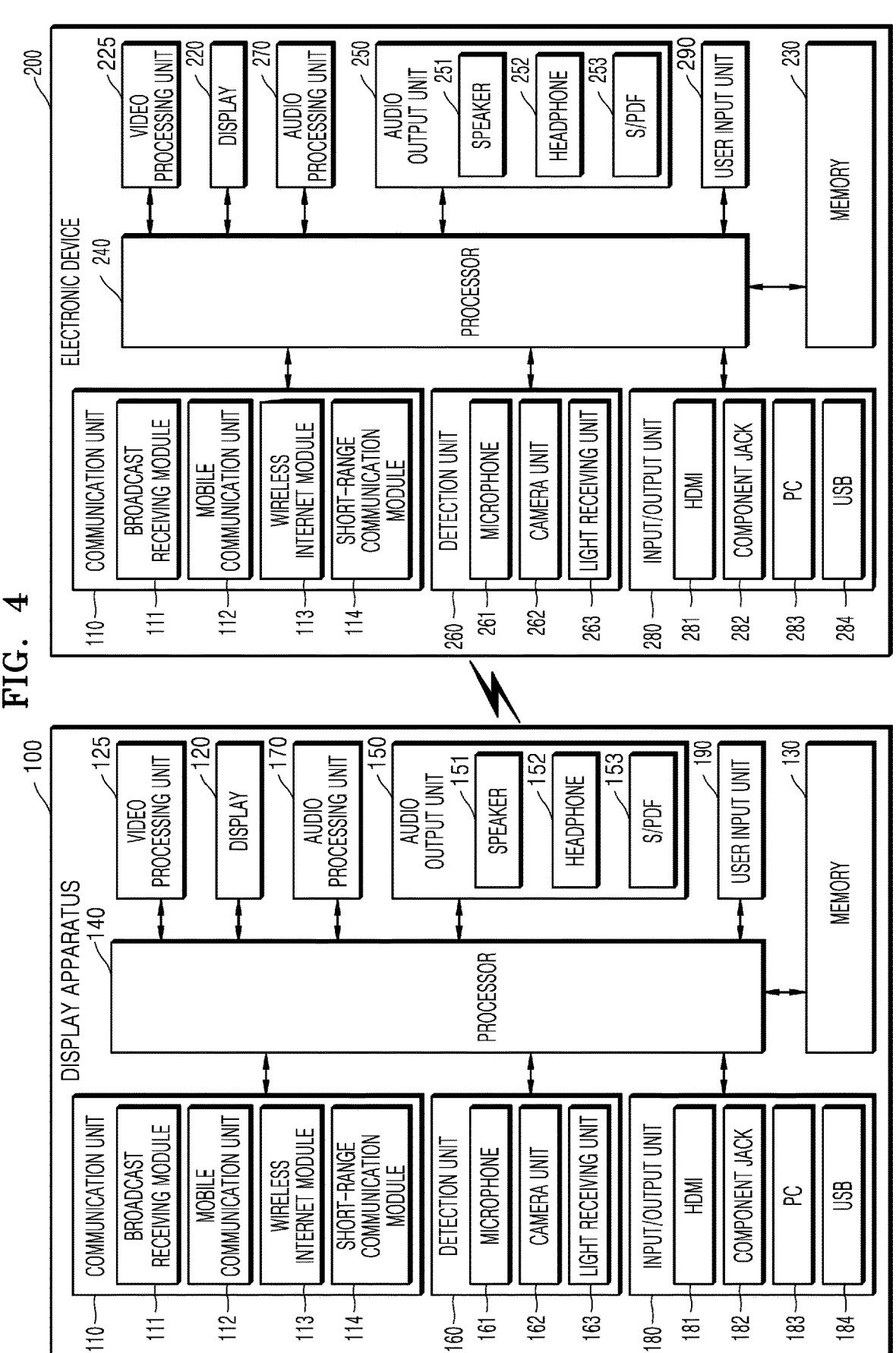
FIG. 4 is a block diagram illustrating an example configuration of a display apparatus and an electronic device, according to various embodiments.

FIG. 4 is a block diagram illustrating an example configuration of a display apparatus and an electronic device, according to various embodiments.

In FIG. 4, the same elements as those in FIG. 3 are denoted by the same reference numerals. Accordingly, when the display apparatus 100 and the electronic device 200 are described, the same description as that made with reference to FIG. 3 may not be repeated.

Referring to FIG. 4, the display apparatus 100 may further include a video processing unit (e.g., including video processing circuitry) 125, an audio processing unit (e.g., including audio processing circuitry) 170, an audio output unit (e.g., including audio output circuitry) 150, a detection unit (e.g., including detection circuitry) 160, an input/output unit (e.g., including input/output circuitry) 180, and a user input unit (e.g., including user input circuitry) 190, in addition to the communication unit 110, the display 120, the memory 130, and the processor 140. The processor 140 may control each element of the display apparatus 100 to perform an operation.

When the memory 130 and the processor 140 are described in FIG. 4, the same description as that made with reference to FIG. 3 may not be repeated.

The communication unit 110 may include one or more modules, each including various communication circuitry, that enable wireless communication between the display apparatus 100 and a wireless communication system or between the display apparatus 100 and a network in which another display apparatus is located. For example, the communication unit 110 may include a broadcast receiving module 111, a mobile communication module 112, a wireless Internet module 113, and a short-range communication module 114. The communication unit 110 may be referred to as a transmitting/receiving unit.

The broadcast receiving module 111 receives a broadcast signal and/or broadcast-related information from an external broadcast management server through a broadcast channel. The broadcast signal may include not only a TV broadcast signal, a radio broadcast signal, and a data broadcast signal, but also a broadcast signal in which a data broadcast signal is combined with a TV broadcast signal or a radio broadcast signal.

The mobile communication module 112 transmits and receives a wireless signal to and from at least one of a base station, an external terminal, or a server, on a mobile communication network. The wireless signal may include various types of data according to exchange of a voice call signal, a video call signal, or a text/multimedia message.

The wireless Internet module 113 refers to a module for wireless Internet access, and may be internally or externally coupled to a device. Examples of wireless Internet technology may include wireless local area network (WLAN) (Wi-Fi), wireless broadband (Wibro), world interoperability for microwave access (Wimax), and high speed downlink packet access (HSDPA). Through the wireless Internet module 113, the display apparatus 100 may establish a Wi-Fi peer to peer (P2P) connection with other devices.

The short-range communication module 114 refers to a module for short-range communication. Examples of short-range communication technology may include Bluetooth, radio frequency identification (RFID), infrared data association (IrDA), ultra-wideband (UWB), and ZigBee.

The display 120 may display an image on a screen under the control of the processor 140. The image displayed on the screen may be received from the communication unit 110, the input/output unit 180, and the memory 130.

The video processing unit 125 may include various video processing circuitry and process image data to be displayed on the display 120, and may perform any of various image processing operations such as decoding, rendering, scaling, noise removal, frame rate conversion, or resolution conversion on the image data.

The audio processing unit 170 may include various audio processing circuitry and processes audio data. The audio processing unit 170 may perform any of various processing operations such as decoding, amplification, or noise removal on the audio data.

The audio output unit 150 may include various audio output circuitry and output an audio included in a broadcast signal received under the control of the processor 140, an audio input through the communication unit 110 or the input/output unit 180, and an audio stored in the memory 130. The audio output unit 150 may include at least one of a speaker 151, a headphone output terminal 152, or a Sony/Phillips digital interface (S/PDIF) output terminal 153.

The detection unit 160 may include various detection circuitry and detect a user's voice, image, or interaction, and may include a microphone 161, a camera unit (e.g., including a camera) 162, and a light receiving unit (e.g., including light receiving circuitry) 163. The microphone 161 may receive, for example, a voice uttered by the user. The microphone 161 may convert the received voice into an electrical signal and may output the electrical signal to the processor 140. The camera unit 162 may include a camera and receive an image (e.g., consecutive frames) corresponding to a motion of the user including a gesture within a camera recognition range. The light receiving unit 163 may include various light receiving circuitry and receives an optical signal (including a control signal) received from a remote control device. The light receiving unit 163 may receive an optical signal corresponding to a user input (e.g., a touch, a press, a touch gesture, a voice, or a motion) from the remote control device. A control signal may be extracted from the received optical signal under the control of the processor 140.

The input/output unit 180 may include various input/output circuitry and receives a video (e.g., a moving image), an audio (e.g., voice or music), and additional information (e.g., EPG) from the outside of the display apparatus 100 under the control of the processor 140. The input/output unit 180 may include one of a high-definition multimedia interface (HDMI) port 181, a component jack 182, a PC port 183, and a universal serial bus (USB) port 184. The input/output unit 180 may include a combination of the HDMI port 841, the component jack 842, the PC port 843, and the USB port 844.

The user input unit 190 may include various input circuitry by which the user inputs data for controlling the display apparatus 100. Examples of the user input unit 190 may include, but not limited to, a keypad, a dome switch, a touch pad, a jog wheel, and a jog switch.

The memory 130 according to an embodiment of the disclosure may store a program for processing and control of the processor 140, and may store data input to the display apparatus 100 or output from the display apparatus 100. Also, the memory 130 may store data required to operate the display apparatus 100.

Programs stored in the memory 130 may be classified into a plurality of modules according to their functions.

The processor 140 may include various processing circuitry and controls an overall operation of the display apparatus 100 and a signal flow between internal elements of the display apparatus 100, and performs a function of processing data. When there is the user's input or pre-set and stored conditions are satisfied, the processor 140 may execute an operating system (OS) and various applications stored in the memory 130.

The processor 140 may include an internal memory. In this case, at least one of data, programs, or instructions stored in the memory 130 may be stored in the internal memory (not shown) of the processor 140.

Components of the block diagram may be integrated, added, or omitted according to specifications of the display apparatus 100 that is actually implemented. For example, when necessary, two or more components may be combined into one component, or one component may be sub-divided into two or more components. Also, a function performed in each block is intended to describe embodiments of the disclosure, and its detailed operations or devices do not limit the scope of the disclosure.

When the electronic device 200 is described, the same description as that made with reference to FIG. 3 may not be repeated.

Referring to FIG. 4, the electronic device 200 may further include a video processing unit (e.g., including video processing circuitry) 225, an audio processing unit (e.g., including audio processing circuitry) 270, an audio output unit (e.g., including audio output circuitry) 250, a detection unit (e.g., including detection circuitry) 260, an input/output unit (e.g., including input/output circuitry) 280, and a user input unit (e.g., including user input circuitry) 290, in addition to the communication unit 210, the display 220, the memory 230, and the processor 240. The processor 240 may include various processing circuitry and control each element of the electronic device 200 to perform an operation.

When the memory 230 and the processor 240 are described in FIG. 4, the same description as that made with reference to FIG. 3 may not be repeated.

The communication unit 210 may include one or more modules, each of which include various communication circuitry, that enables wireless communication between the electronic device 200 and a wireless communication system or between the electronic device 200 and a network in which another display apparatus is located. For example, the communication unit 210 may include a broadcast receiving module 211, a mobile communication module 212, a wireless Internet module 213, and a short-range communication module 214. The communication unit 210 may be referred to as a transmitting/receiving unit.

The broadcast receiving module 211 receives a broadcast signal and/or broadcast-related information from an external broadcast management server through a broadcast channel. The broadcast signal may include not only a TV broadcast signal, a radio broadcast signal, and a data broadcast signal, but also a broadcast signal in which a data broadcast signal is combined with a TV broadcast signal or a radio broadcast signal.

The mobile communication module 212 transmits and receives a wireless signal to and from at least one of a base station, an external terminal, or a server, on a mobile communication network. The wireless signal may include various types of data according to exchange of a voice call signal, a video call signal, or a text/multimedia message.

The wireless Internet module 213 refers to a module for wireless Internet access, and may be internally or externally coupled to a device. Examples of wireless Internet technology may include wireless local area network (WLAN) (Wi-Fi), wireless broadband (Wibro), world interoperability for microwave access (Wimax), and high speed downlink packet access (HSDPA). Through the wireless Internet module 213, the display apparatus 100 may establish a Wi-Fi peer to peer (P2P) connection with other devices.

The short-range communication module 214 refers to a module for short-range communication. Examples of short-range communication technology may include Bluetooth, radio frequency identification (RFID), infrared data association (IrDA), ultra-wideband (UWB), and ZigBee.

The display 220 may display an image on a screen under the control of the processor 240. The image displayed on the screen may be received from the communication unit 210, the input/output unit 280, and the memory 230.

The video processing unit 225 may include various video processing circuitry and process image data to be displayed on the display 220, and may perform any of various image processing operations such as decoding, rendering, scaling, noise removal, frame rate conversion, or resolution conversion on the image data.

The audio processing unit 270 may include various audio processing circuitry and processes audio data. The audio processing unit 270 may perform any of various processing operations such as decoding, amplification, or noise removal on the audio data.

The audio output unit 250 may include various audio output circuitry and output an audio included in a broadcast signal received under the control of the processor 240, an audio input through the communication unit 210 or the input/output unit 280, and an audio stored in the memory 230. The audio output unit 250 may include at least one of a speaker 251, a headphone output terminal 252, or a Sony/Phillips digital interface (S/PDIF) output terminal 253.

The detection unit 260 may include various detection circuitry and detect the user's voice, image, or interaction, and may include a microphone 261, a camera unit 262, and a light receiving unit 263. The microphone 261 receives a voice uttered by the user. The microphone 261 may convert the received voice into an electrical signal and may output the electrical signal to the processor 240. The camera unit 262 may receive an image (e.g., consecutive frames) corresponding to a motion of the user including a gesture within a camera recognition range. The light receiving unit 263 receives an optical signal (including a control signal) received from a remote control device. The light receiving unit 263 may receive an optical signal corresponding to a user input (e.g., a touch, a press, a touch gesture, a voice, or a motion) from the remote control device. A control signal may be extracted from the received optical signal under the control of the processor 240.

The Input/output unit 280 may include various input/output circuitry and receives a video (e.g., a moving image), an audio (e.g., voice or music), and additional information (e.g., EPG) from the outside of the electronic device 200 under the control of the processor 240. The input/output unit 280 may include one of a high-definition multimedia interface (HDMI) port 281, a component jack 282, a PC port 283, and a USB port 284. The input/output unit 280 may include a combination of the HDMI port 281, the component jack 282, the PC port 283, and the USB port 284.

The user input unit 290 may include various input circuitry by which the user inputs data for controlling the electronic device 200. Examples of the user input unit 990 may include, but not limited to, a keypad, a dome switch, a touch pad, a jog wheel, and a jog switch.

The memory 230 according to an embodiment of the disclosure may store a program for an operation and control of the processor 240, and may store data input to or output from the electronic device 200. The memory 230 may store data required to operate the electronic device 200.

Programs stored in the memory 230 may be classified into a plurality of modules according to their functions.

The processor 240 may include various processing circuitry and controls an overall operation of the electronic device 200 and a signal flow between internal elements of the electronic device 200, and performs a function of processing data. When there is the user's input or pre-set and stored conditions are satisfied, the processor 240 may execute an operating system (OS) and various applications stored in the memory 230.

The processor 240 may include an internal memory. In this case, at least one of data, programs, or instructions stored in the memory 230 may be stored in the internal memory (not shown) of the processor 240.

Components of the block diagram may be integrated, added, or omitted according to specifications of the electronic device 200 that is actually implemented. For example, when necessary, two or more components may be combined into one component, or one component may be sub-divided into two or more components. Also, a function performed in each block is intended to describe embodiments of the disclosure, and its detailed operations or devices do not limit the scope of the disclosure.

Figure 5:
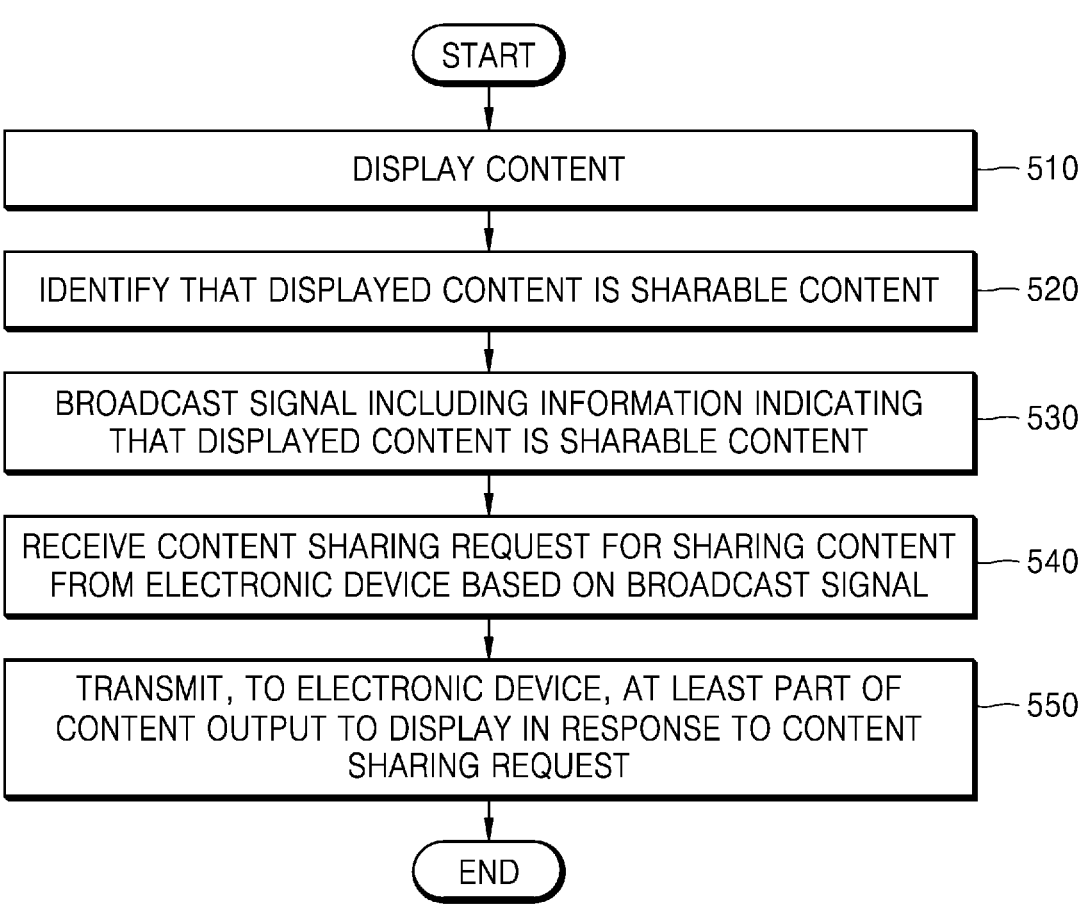
FIG. 5 is a flowchart illustrating an example method of operating a display apparatus, according to various embodiments.

FIG. 5 is a flowchart illustrating an example method of operating a display apparatus, according to various embodiments.

Referring to FIG. 5, in operation 510, the display apparatus 100 may display content. The display apparatus 100 may receive content from various content providing sources and may display the content. For example, the display apparatus 100 may retrieve and display content stored in an internal memory of the display apparatus 100, may display content received from an external input device connected through a wired/wireless interface, or may display content received through the Internet or a broadcast network. Content displayed on the display apparatus 100 may include various types of content. For example, the content may include various types of content such as moving image content, still image content, and game content.

In operation 520, the display apparatus 100 may identify that the displayed content is sharable content.

The display apparatus 100 according to an embodiment of the disclosure may identify whether content is sharable content in order to share content, available through a content sharing operation among pieces of content displayed on the display apparatus 100, with other neighboring devices according to content sharing technology. Whether content is sharable content may be identified by checking whether the content is content free from a copyright issue. Accordingly, when it is identified whether content is sharable content, it may refer, for example, to it being identified whether the content is sharable by content sharing technology. For content free from a copyright issue, the display apparatus 100 may perform an operation of photographing or sharing according to content sharing technology. However, for content not free from a copyright issue, the display apparatus 100 may not perform an operation of photographing or sharing according to content sharing technology. Content free from a copyright issue may refer to content with no copyright issue, such as content for which copyright itself does not exists, content for which copyright has expired, or content for which copyright is limited. Because the display apparatus 100 according to an embodiment of the disclosure enables content free from a copyright issue to be shared with other devices according to a user's intention, the user may conveniently utilize the content.

According to an embodiment of the disclosure, the display apparatus 100 may identify that the displayed content is sharable content based on attribute information of the displayed content. The display apparatus 100 may obtain attribute information of content through metadata, etc. of the content. The attribute information of the content may include at least one of identification information of the content, a category of the content, or copyright information of the content.

According to an embodiment of the disclosure, the display apparatus 100 may identify whether content is sharable content, that is, content free from a copyright issue, using at least one of identification information of the content, a category of the content, or copyright information of the content.

According to an embodiment of the disclosure, the display apparatus 100 may identify that the content is sharable content by communicating with an external server that provides copyright information of pieces of content. For example, the display apparatus 100 may obtain copyright information of the content from an external server by inquiring the external server that provides copyright information of various content for copyright information of the content using identification information of the content displayed on the display apparatus 100 and receiving the copyright information of the content in response to the inquiry, and the display apparatus 100 may identify that the content is sharable content based on the obtained copyright information.

According to an embodiment of the disclosure, the display apparatus 100 may identify that the displayed content is sharable content when the display apparatus 100 is in a game mode auto. For example, when an auto low latency mode (ALLM) is recognized in a game mode, the display apparatus 100 may identify that the displayed content is sharable content. ALLM is one of HDMI 2.1 standard specifications and relates to a technology for reducing a delay time between a controller input and a game content output. For example, a device such as a PC or a game console that supports HDMI 2.1 includes ALLM information in an HDMI information frame, and the display apparatus 100 may check ALLM information from an HDMI information frame received from a device such as a PC or a game console.

In operation 530, the display apparatus 100 may broadcast a signal including state information indicating that the displayed content is sharable content.

The display apparatus 100 may broadcast a signal including state information indicating that the content currently displayed on the display apparatus 100 is photographable content, that is, sharable content, so that neighboring electronic devices receiving the signal recognize that the content may be requested to be shared. That is, when a signal including state information indicating that the content is sharable content is broadcast, an electronic device wishing to share the content from among electronic devices receiving the broadcast signal may send a content sharing request to the display apparatus 100.

According to an embodiment of the disclosure, the display apparatus 100 may broadcast a signal including state information indicating that the displayed content is sharable content using any of various short-range communication technologies. For example, the display apparatus 100 may broadcast a signal using any of various short-range communication technologies such as Wi-Fi communication technology, Bluetooth communication technology, or BLE communication technology.

In operation 540, the display apparatus 100 may receive a content sharing request for sharing content from the electronic device 200 based on the broadcast signal.

When the display apparatus 100 broadcasts a signal including state information indicating that the displayed content is sharable content using any of various short-range communication technologies, an electronic device wishing to share the content displayed on the display apparatus 100 from among one or more electronic devices receiving the broadcast signal may transmit a content sharing request to the display apparatus 100, and the display apparatus 100 may receive the content sharing request.

According to an embodiment of the disclosure, the display apparatus 100 may receive a content sharing request from the electronic device 200 using any of various communication technologies. For example, the display apparatus 100 may receive a content sharing request from the electronic device using any of various short-range communication technologies such as Wi-Fi communication technology, Bluetooth communication technology, or BLE communication technology.

According to an embodiment of the disclosure, the display apparatus 100 may receive an inquiry to identify whether a sender of the broadcast is the display apparatus 100 from the electronic device 200, may transmit a response signal indicating that the sender of the broadcast signal is the display apparatus 100 to the electronic device 200 in response to the inquiry of the electronic device 200, and may receive a content sharing request from the electronic device.

In operation 550, the display apparatus 100 may transmit at least part of the content output to a display in response to the content sharing request to the electronic device 200 using content sharing technology.

According to an embodiment of the disclosure, the display apparatus 100 may transmit at least part of the content displayed on the display to the electronic device in response to the content sharing request of the electronic device using any of various content sharing technologies.

According to an embodiment of the disclosure, the display apparatus 100 may transmit the entire content displayed on the display to the electronic device using content sharing technology. In this case, when the content displayed on the display includes video content and graphic content such as a user interface overlaid on the video content, the display apparatus 100 may transmit both the video content and the graphic content using content sharing technology. In this case, the graphic content additionally transmitted in addition to the video content may be content not wanted by the user of the electronic device.

According to an embodiment of the disclosure, the display apparatus 100 may transmit only some of the content displayed on the display, that is, only the video content, to the electronic device using content sharing technology. Because the user of the electronic device is likely to want to use only the video content, the display apparatus 100 may filter and transmit additional content such as a user interface other than the video content.

FIG. 6 is a flowchart illustrating an example method of operating an electronic device to share content displayed on a display apparatus, according to various embodiments.

Referring to FIG. 6, in operation 610, the electronic device 200 may obtain an image of a screen of the display apparatus 100 that displays content, through a camera.

For example, a user who carries the electronic device 200 may want to use content displayed on the display apparatus 100 for personal purposes while watching the content through the display apparatus 100. The user may want to capture or record part of the content displayed on the display apparatus 100 and use the captured or recorded content for personal purposes. For example, the user may want to capture or record part of movie content displayed on the display apparatus 100 and upload the captured or recorded part of the content to a social network service application or the like. In this case, the user may control the screen of the display apparatus 100 to be photographed or previewed using the camera of the electronic device 200.

In operation 620, the electronic device 200 may receive a broadcast signal including state information indicating that the content displayed on the display apparatus 100 is sharable content.

According to an embodiment of the disclosure, the electronic device 200 may receive the broadcast signal from the display apparatus 100 using any of various short-range communication technologies, and may check the state information indicating that the content displayed on the display apparatus 100 is sharable content from the received broadcast signal. For example, the electronic device 200 may include a BLE communication module that may always receive a BLE signal, and may extract such state information from the received BLE signal through the BLE communication module.

In operation 630, the electronic device 200 may identify that (e.g., determine whether) the display apparatus of the image obtained through the camera is the display apparatus transmitting the broadcast signal, using the broadcast signal.

There may be more display apparatuses other than the display apparatus 100 in a space where the user enjoys the content through the display apparatus 100, and other display apparatuses may also display content. In various situations including this situation, the electronic device 200 needs to identify whether the display apparatus sending the broadcast signal is the same as the display apparatus that actually displays the content. Accordingly, the electronic device 200 may perform an operation of checking whether the display apparatus sending the broadcast signal is the same as the display apparatus that actually displays the content.

According to an embodiment of the disclosure, the electronic device 200 may transmit a signal for requesting to identify whether the display apparatus 100 is the apparatus that currently displays the content to the display apparatus 100 sending the broadcast signal, and when the display apparatus 100 provides a response to the identification request signal, the electronic device 200 may check the response to identify whether the display apparatus 100 is the apparatus that currently displays the content.

According to an embodiment of the disclosure, the electronic device 200 may transmit a signal for requesting to identify whether the display apparatus 100 is the apparatus that currently displays the content to the display apparatus 100 sending the broadcast, and the display apparatus 100 may output pre-determined (e.g., specified) response information to a display of the display apparatus 100, in response to the identification request signal. The electronic device 200 may check whether the display apparatus 100 is the apparatus that currently displays the content, by analyzing the image of the screen of the display apparatus 100 obtained through the camera and extracting response information from the analyzed image of the screen. For example, the display apparatus 100 may insert a visible or invisible watermark into the content displayed on the display as pre-determined response information, and the electronic device 200 may check that the display apparatus 100 is the apparatus that currently displays the content by recognizing or extracting the visible or invisible watermark from the image of the screen of the displayed apparatus 100 obtained through the camera.

In operation 640, as the electronic device 200 checks that (e.g., determines whether) the apparatus sending the broadcast signal is the display apparatus that currently displays the content, the electronic device 200 may transmit a content sharing request for sharing the content to the display apparatus.

According to an embodiment of the disclosure, when checking is made, the electronic device 200 may automatically transmit a content sharing request to the display apparatus 100.

According to an embodiment of the disclosure, when checking is made, the electronic device 200 may inquire the user whether he or she actually wants to share the content, and when there is a user selection or input for the inquiry, the electronic device 200 may transmit a content sharing request to the display apparatus 100.

According to an embodiment of the disclosure, the electronic device 200 may transmit a content sharing request to the display apparatus 100 using any of various short-range communication technologies.

According to an embodiment of the disclosure, when sending the content sharing request, the electronic device 200 may include and transmit information for requesting to filter graphic content such as a graphic user interface and transmit only video content.

In operation 650, the electronic device 200 may receive, from the display apparatus 100, at least part of the content output to the display of the display apparatus in response to the content sharing request through content sharing technology.

According to an embodiment of the disclosure, the electronic device 200 may output the content received from the display apparatus 100 through a display of the electronic device 200 using content sharing technology. That is, until the content is received and displayed through content sharing technology, the electronic device 200 outputs the image of the display screen of the display apparatus 100 obtained through the camera of the electronic device 200 as a preview, but as the electronic device 200 receives the content through content sharing technology, the electronic device 200 may display the content received through a communication network on the display. Accordingly, because the electronic device 200 displays the content received through the communication network, disadvantages of capturing the image of the screen of the display apparatus 100 and displaying the image on the display, for example, images around the display apparatus are also obtained, other objects are reflected on the display screen of the display apparatus, or the screen of the display apparatus is distorted, may be prevented and/or reduced.

According to an embodiment of the disclosure, the electronic device 200 may provide various user interfaces that enable operations such as recording or capturing content displayed on the display of the electronic device 200, and may perform an operation of recording or capturing the content according to a user input received through the provided user interfaces.

Figure 7:
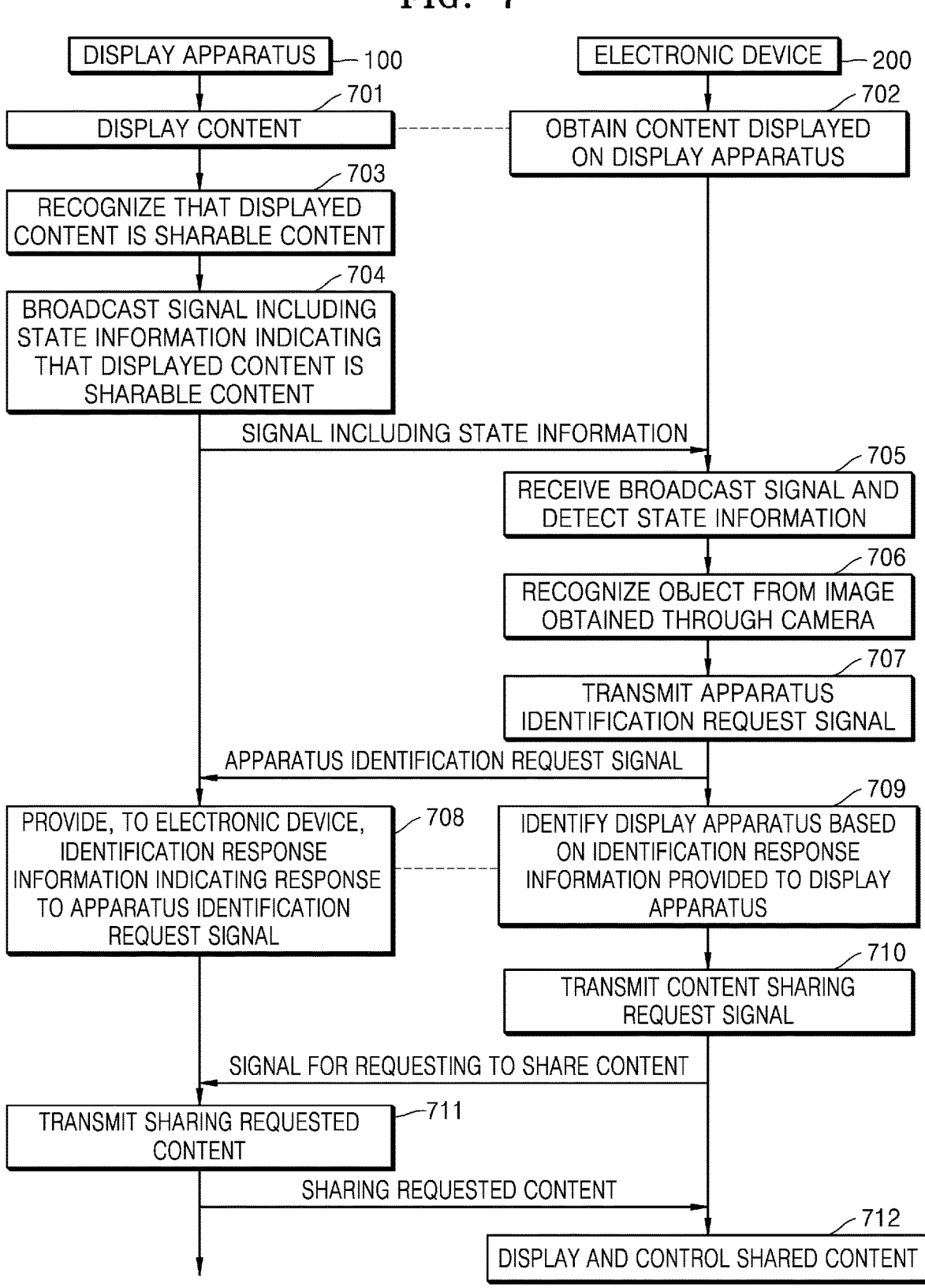
FIG. 7 is a signal flow diagram illustrating example methods of operating a display apparatus and an electronic device to share content, according to various embodiments.

FIG. 7 is a signal flow diagram illustrating example methods of operating a display apparatus and an electronic device to share content, according to various embodiments.

Referring to FIG. 7, in operation 701, the display apparatus 100 may display content on a display. The display apparatus 100 may obtain content according to a user's request through various sources, and may display the obtained content. For example, the display apparatus 100 may retrieve and display content stored in an internal memory of the display apparatus 100, may display content received from an external input device connected through a wired/wireless interface, or may display content received through the Internet or a broadcast network. Content displayed on the display apparatus 100 may include various types of content. For example, the content may include various types of content such as moving image content, still image content, and game content.

In operation 702, the electronic device 200 may obtain the content displayed on a screen of the display apparatus 100 through, for example, a camera. In order for the user of the electronic device 200 to capture or record at least part of the content displayed on the display apparatus 100 while enjoying the content displayed on the display apparatus 100, the electronic device 200 may obtain an image of the screen of the display apparatus 100 through the camera by making the camera of the electronic device 200 face the screen of the display apparatus 100 using a camera application of the electronic device 200, and may display a preview image on the display of the electronic device 200.

Operation 702 is not necessarily performed before operation 705 in which a broadcast signal is detected as shown in FIG. 7, and operation 702 needs only to be performed before operation 706.

In operation 703, the display apparatus 100 may recognize that the content displayed on the display is sharable content.

The display apparatus 100 according to an embodiment of the disclosure needs to identify whether content is sharable content in order to share content, available through a content sharing operation among pieces of content displayed on the display apparatus 100, with other neighboring devices according to content sharing technology. Whether content is sharable content may be identified by checking whether the content is content free from a copyright issue. Accordingly, when it is identified whether content is sharable content, it may refer, for example, to it being identified whether the content is sharable by content sharing technology. For content free from a copyright issue, the display apparatus 100 may perform an operation of photographing or sharing according to content sharing technology. However, for content not free from a copyright issue, the display apparatus 100 may not perform an operation of photographing or sharing according to content sharing technology. Content free from a copyright issue may refer to content with no copyright issue, such as content for which copyright itself does not exists, content for which copyright has expired, or content for which copyright is limited. Because the display apparatus 100 according to an embodiment of the disclosure enables content free from a copyright issue to be shared with other devices according to the user's intention, the user may conveniently utilize the content.

According to an embodiment of the disclosure, the display apparatus 100 may identify that the content displayed is sharable content based on attribute information of the displayed content. The display apparatus 100 may obtain attribute information of content through metadata, etc. of the content. The attribute information of the content may include at least one of identification information of the content, a category of the content, or copyright information of the content.

According to an embodiment of the disclosure, the display apparatus 100 may identify whether content is sharable content, that is, content free from a copyright issue, using at least one of identification information of the content, a category of the content, or copyright information of the content.

According to an embodiment of the disclosure, the display apparatus 100 may identify that the content is sharable content by communicating with an external server that provides copyright information of pieces of content. For example, the display apparatus 100 may obtain copyright information of the content from an external server by inquiring the external server that provides copyright information of various content for copyright information of the content using identification information of the content displayed on the display apparatus 100 and receiving the copyright information of the content in response to the inquiry, and the display apparatus 100 may identify that the content is sharable content based on the obtained copyright information.

In operation 704, the display apparatus 100 may broadcast a signal including state information indicating that the displayed content is sharable content.

The display apparatus 100 may broadcast a signal including state information indicating that the content currently displayed on the display apparatus 100 is sharable content, so that neighboring electronic devices receiving the signal recognize that the content may be requested to be shared. That is, when a signal including state information indicating that content is sharable content is broadcast, an electronic device wishing to share the content from among electronic devices receiving the broadcast signal may send a content sharing request to the display apparatus 100.

According to an embodiment of the disclosure, the display apparatus 100 may broadcast a signal including state information indicating that the displayed content is sharable content using any of various short-range communication technologies. For example, the display apparatus 100 may broadcast a signal using any of various short-range communication technologies such as Wi-Fi communication technology, Bluetooth communication technology, or BLE communication technology. For example, the display apparatus 100 may transmit state information in a Wi-Fi signal according to Wi-Fi communication technology, may transmit state information in a Bluetooth signal according to Bluetooth communication technology, or may transmit state information in a BLE signal according to BLE communication technology.

In operation 705, the electronic device 200 may receive the broadcast signal from the display apparatus 100 and may detect the state information.

According to an embodiment of the disclosure, the electronic device 200 may receive the broadcast signal from the display apparatus 100 using any of various short-range communication technologies, and may check the state information indicating that the content displayed on the display apparatus 100 is sharable content from the received broadcast signal. For example, the electronic device 200 may include a BLE communication module that may always receive a BLE signal, and may extract state information from the received BLE signal through the BLE communication module.

In operation 706, the electronic device 200 may recognize a pre-determined (e.g., specified) object from the image of the screen of the display apparatus 100 obtained through the camera. According to an embodiment of the disclosure, the electronic device 200 may recognize the pre-determined object from the image of the screen of the display apparatus 100 obtained through the camera, based on the broadcast signal including the state information received from the display apparatus 100. That is, in a state where the electronic device 200 receives the broadcast signal including the state information from the display apparatus 100, the electronic device 200 may perform an operation of recognizing the pre-determined object from the image of the screen of the display apparatus 100 obtained through the camera. The electronic device 200 may check that the electronic device 200 currently captures the image of the screen of the display apparatus by recognizing the pre-determined object, for example, an object representing the screen of the display apparatus, from the image of the screen of the display apparatus 100 obtained through the camera. That is, in order to identify whether the screen of the display apparatus is included in the image of the screen captured by the electronic device 200, the electronic device 200 may determine the pre-determined object that may represent the screen of the display apparatus, and may determine whether the pre-determined object is included in the image captured by the electronic device 200. As such, when the electronic device 200 recognizes the pre-determined object from the image of the screen of the display apparatus 100 obtained through the camera and detects the state information from the received broadcast signal in operation 705, the electronic device 200 may perform an operation of checking whether the apparatus sending the broadcast signal is the same as the display apparatus of the image obtained by the electronic device 200 through the camera.

Figure 8:
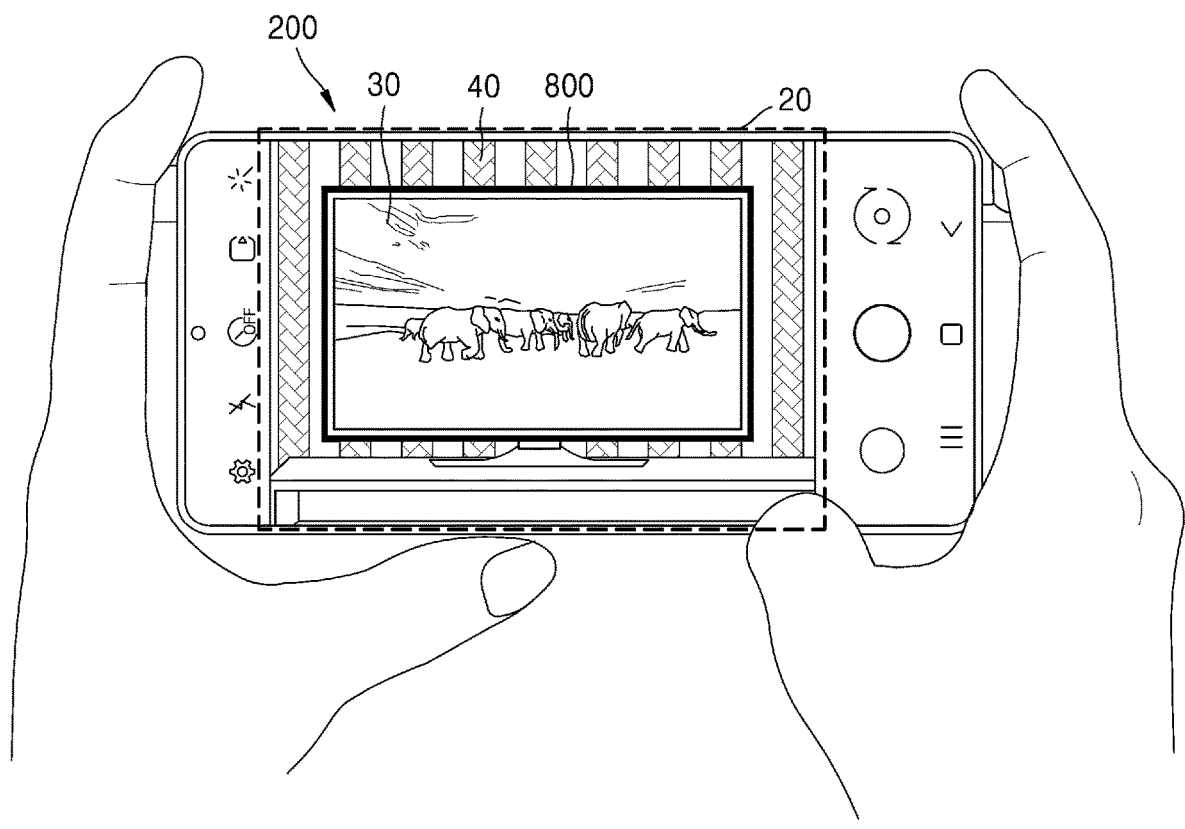
FIG. 8 is a diagram illustrating an example where an electronic device recognizes a pre-determined object in an obtained image, according to various embodiments.

FIG. 8 is a diagram illustrating an example where an electronic device recognizes a pre-determined object in an obtained image, according to various embodiments.

Referring to FIG. 8, the electronic device 200 may capture an image of a screen of the display apparatus 100 through a camera, and may display, on a display, an image 20 including the captured image of the screen of the display apparatus 100 through a preview. No matter how a user manipulates the camera of the electronic device 200 to accurately capture only the image of the screen of the display apparatus 100, the image 20 actually output by the electronic device 200 through the preview may include not only a screen image 30 of the display apparatus 100 but also a background image 40 around the display apparatus 100 or a wall on which the display apparatus 100 is installed.

The electronic device 200 may detect a pre-determined object 800 to recognize the display apparatus from the image 20 obtained through the camera. The pre-determined object

800 only needs to be an object having a shape for recognizing the screen of the display apparatus. For example, the pre-determined object 800 may include an object having a quadrangular or rectangular shape. The electronic device 200 may recognize or detect a pre-determined object from an image using any of various object recognition technologies. The various object recognition technologies may include rule-based object recognition technology or artificial intelligence-based object recognition technology.

When the electronic device 200 recognizes an image moving in the detected pre-determined object, the electronic device 200 may recognize that the recognized pre-determined object is an image corresponding to the screen of the display apparatus. The electronic device 200 may recognize or detect that there is a video in the pre-determined object using any of various video recognition technologies. The various video recognition technologies may include rule-based video recognition technology or artificial intelligence-based video recognition technology.

Referring back to FIG. 7, through operations 705 and 706, when the state information is detected from the broadcast signal received from the display apparatus 100 and the object representing the screen of the display apparatus is detected in the image captured by the electronic device 200, the electronic device 200 may proceed to operation 707 to identify whether the display apparatus 100 sending the broadcast signal is the same as the display apparatus recognized by the electronic device 200 in the image captured through the camera.

In operation 707, the electronic device 200 may transmit an apparatus identification request signal to the display apparatus 100. The electronic device 200 may check address information of the display apparatus 100 transmitting the broadcast signal from the broadcast signal received in operation 705, and the electronic device 200 may transmit an apparatus identification request signal to the display apparatus 100 using the checked address information.

According to an embodiment of the disclosure, the electronic device 200 may transmit an apparatus identification request signal to the display apparatus 100 using any of various short-range communication technologies. The various short-range communication technologies may include Wi-Fi communication technology, Bluetooth communication technology, and BLE communication technology. The apparatus identification request signal may be a signal that requests or guides the display apparatus 100 receiving the apparatus identification request signal to insert and output pre-determined response information in an image output by the display apparatus 100.

In operation 708, the display apparatus 100 may receive the apparatus identification request signal from the electronic device 200, and may provide identification response information indicating a response to the received apparatus identification request signal to the electronic device 200. The display apparatus 100 may provide identification response information corresponding to the apparatus identification request signal to the electronic device 200 using any of various methods.

According to an embodiment of the disclosure, the display apparatus 100 may insert and output a pre-determined watermark into the content output to the display of the display apparatus 100 as an example of the identification response information. The pre-determined watermark inserted into the content may be visible or invisible. A visible watermark refers to a watermark that may be seen or perceived by a user's eye, and an invisible watermark refers to a watermark that may not be seen or perceived by a user's eye but may be recognized by internal processing of an electronic device. When the pre-determined watermark is inserted into the content, the electronic device 200 may check that the display apparatus 100 is the display apparatus to which the electronic device 200 sends the apparatus identification request signal by recognizing the pre-determined watermark inserted into the content when capturing the image of the screen of the display apparatus 100. The watermark is a watermark pre-determined between the display apparatus 100 and the electronic device 200, and the electronic device 200 may check the display apparatus 100 by detecting the pre-determined watermark.

According to an embodiment of the disclosure, the display apparatus 100 may insert or add and output a quick response (QR) code into the content output to the display of the display apparatus 100 as an example of the identification response information.

According to an embodiment of the disclosure, the display apparatus 100 may add and output an object as graphic content overlaid on the content output to the display of the display apparatus 100 as an example of the identification response information. The object as graphic content is an object pre-determined between the display apparatus 100 and the electronic device 200, and the electronic device 200 may check the display apparatus 100 by detecting the pre-determined object.

Figure 9:
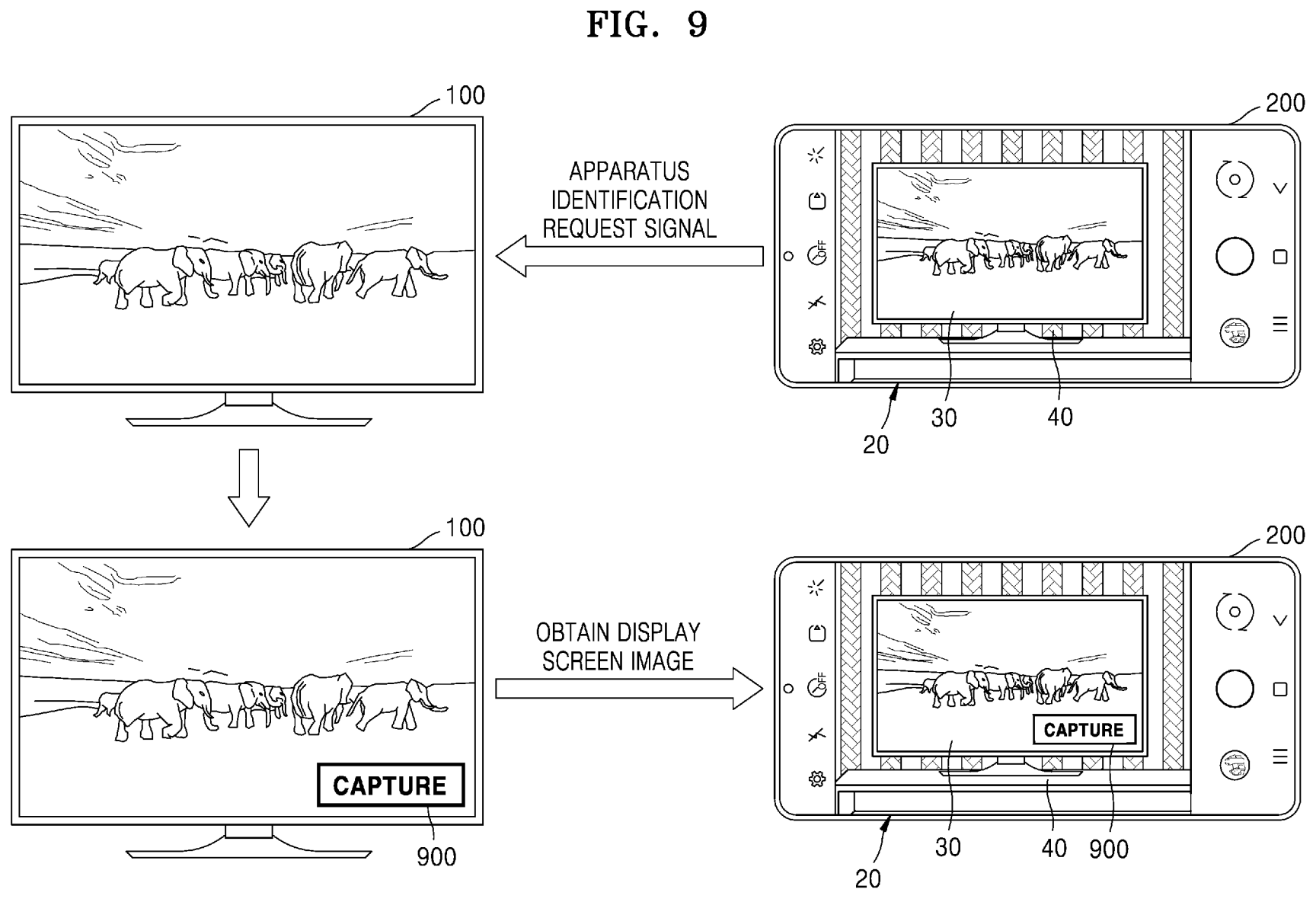

FIG. 9 is a diagram illustrating an example where a display apparatus provides identification response information according to an apparatus checking request from an electronic device, according to various embodiments.

Referring to FIG. 9, when the electronic device 200 transmits an apparatus identification request signal to the display apparatus 100, the display apparatus 100 may provide, to the electronic device 200, identification response information for proving that the display apparatus 100 is an apparatus displaying sharable content in response to the apparatus identification request signal.

The display apparatus 100 may insert and output a pre-determined watermark into the content output to a display, as identification response information. Referring to FIG. 9, the display apparatus 100 may output text 900 saying, for example, <CAPTURE> as a pre-determined watermark to the content. As such, when the display apparatus 100 includes and outputs the text 900 that may be a watermark in the output content, the electronic device 200 capturing an image of a screen of the display apparatus 100 may obtain the image of the screen of the display apparatus 100 including the text 900, and may check that the display apparatus currently captured by the electronic device 200 is an apparatus transmitting a broadcast signal including state information by extracting or recognizing the text 900 as a pre-determined watermark from the obtained image. Although the pre-determined watermark is visible to a user in FIG. 9, the pre-determined watermark may be invisible.

Referring back to FIG. 7, when the display apparatus 100 outputs the identification response information indicating the response to the apparatus identification request signal in operation 708, the electronic device 200 may obtain the image of the screen of the display apparatus 100 including the identification response information, and may recognize the identification response information in the obtained image in operation 709. The electronic device 200 may check the display apparatus 100 based on the recognized identification response information. That is, the electronic device 200 may check that the apparatus to which the electronic device 200 sends the apparatus identification request signal is the same as the display apparatus whose screen image is currently captured by the electronic device 200.

In operation 710, when the checking of the display apparatus 100 is completed, the electronic device 200 may transmit a content sharing request signal for sharing the content displayed on the display apparatus 100 to the display apparatus 100.

According to an embodiment of the disclosure, when the checking is made, the electronic device 200 may automatically transmit a content sharing request to the display apparatus 100.

According to an embodiment of the disclosure, when the checking of the display apparatus is completed, the electronic device 200 may provide a visual effect to the object 800 illustrated in FIG. 8 to show the user that the checking of the display apparatus has been completed. For example, the electronic device 200 may indicate that the screen of the display apparatus is recognized by highlighting or bolding on or around the object 800 of FIG. 8.

According to an embodiment of the disclosure, the electronic device 200 may transmit a content sharing request to the display apparatus 100 using any of various short-range communication technologies. The various short-range communication technologies may include Wi-Fi communication technology, Bluetooth communication technology, and BLE communication technology.

According to an embodiment of the disclosure, the electronic device 200 may perform an operation of establishing a connection with the display apparatus 100 by transmitting BT MAC, Wi-Fi MAC, or P2P MAC using Wi-Fi Direct communication technology, and may transmit a content sharing request through the connection.

In operation 711, as the display apparatus 100 receives the content sharing request from the electronic device 200, the display apparatus 100 may transmit the sharing requested content to the electronic device 200.

According to an embodiment of the disclosure, the display apparatus 100 may transmit at least part of the content displayed on the display to the electronic device 200 in response to the content sharing request of the electronic device using any of various content sharing technologies.

According to an embodiment of the disclosure, the display apparatus 100 may transmit the entire content displayed on the display to the electronic device using content sharing technology. In this case, when the content displayed on the display includes video content and graphic content such as a user interface overlaid on the video content, the display apparatus 100 may transmit both the video content and the graphic content using content sharing technology. In this case, the graphic content additionally transmitted in addition to the video content may be content not wanted by the user of the electronic device.

According to an embodiment of the disclosure, the display apparatus 100 may transmit only some of the content displayed on the display, that is, only the video content, to the electronic device using content sharing technology. Because the user of the electronic device is likely to want to use only the video content, the display apparatus 100 may filter and transmit additional content such as a user interface other than the video content.

In operation 712, the electronic device 200 may receive, from the display apparatus 100, at least part of the content output to the display of the display apparatus in response to the content sharing request using content sharing technology.

According to an embodiment of the disclosure, the electronic device 200 may output the content received from the display apparatus 100 through a display of the electronic device 200 through content sharing technology. That is, until the content is received and displayed through content sharing technology, the electronic device 200 outputs the image of the display screen of the display apparatus 100 obtained through the camera of the electronic device 200 as a preview, but as the electronic device 200 receives the content through content sharing technology, the electronic device 200 may display the content received through a communication network on the display. Accordingly, because the electronic device 200 displays the content received through the communication network, disadvantages of capturing the image of the screen of the display apparatus 100 and displaying the image on the display, for example, images around the display apparatus are also obtained, other objects are reflected on the display screen of the display apparatus, or the screen of the display apparatus is distorted, may be prevented and/or reduced.

Figure 10:
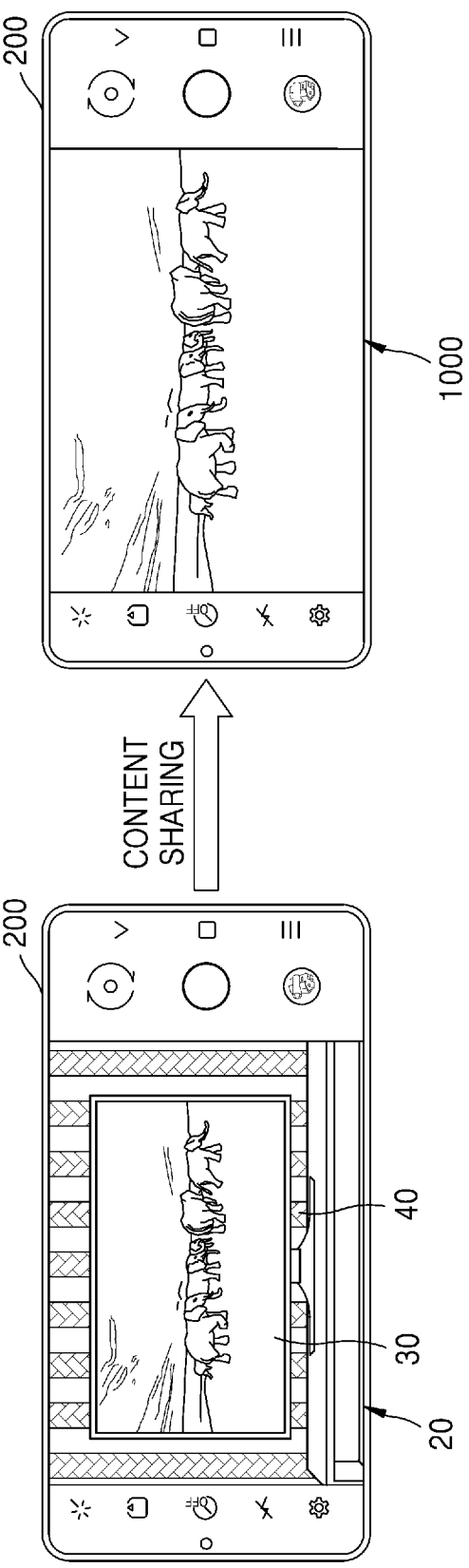
FIG. 10 is a diagram illustrating an example where an electronic device outputs shared content received from a display apparatus, according to various embodiments.

FIG. 10 is a diagram illustrating an example where an electronic device outputs shared content received from a display apparatus, according to various embodiments.

Referring to FIG. 10, because the electronic device 200 captures an image of a screen of the display apparatus 100 through a camera using a camera application before receiving shared content from the display apparatus 100, a display of the electronic device 200 may display the image 20 including the screen image 30 of the display apparatus and the background image 40 around the display apparatus 100.

When the electronic device 200 checks the display apparatus 100, sends a content sharing request to the display apparatus 100, and receives sharing requested content, the electronic device 200 may directly output the shared content on the display. Accordingly, the display of the electronic device 200 may directly display shared content 1000 received from the display apparatus 100, instead of the screen image of the display apparatus obtained through the camera.

According to an embodiment of the disclosure, when the electronic device 200 outputs the shared content received from the display apparatus 100, the electronic device 200 may output the shared content through the camera application. Accordingly, in this case, for a portion other than a portion where the shared content is output, a user interface of the camera application may be used as it is.

According to an embodiment of the disclosure, when the electronic device 200 outputs the shared content received from the display apparatus 100, the electronic device 200 may output the shared content through a content sharing application. Accordingly, in this case, for a portion other than a portion where the shared content is output, a user interface of the content sharing application may be used as it is.

According to an embodiment of the disclosure, when the electronic device 200 outputs the shared content received from the display apparatus 100, the electronic device 200 may output the shared content through a dedicated application.

According to an embodiment of the disclosure, the electronic device 200 may provide various user interfaces that enable operations such as recording or capturing content displayed on the display of the electronic device 200, and may perform an operation of recording or capturing the content according to a user input received through the provided user interfaces.

Figure 11:
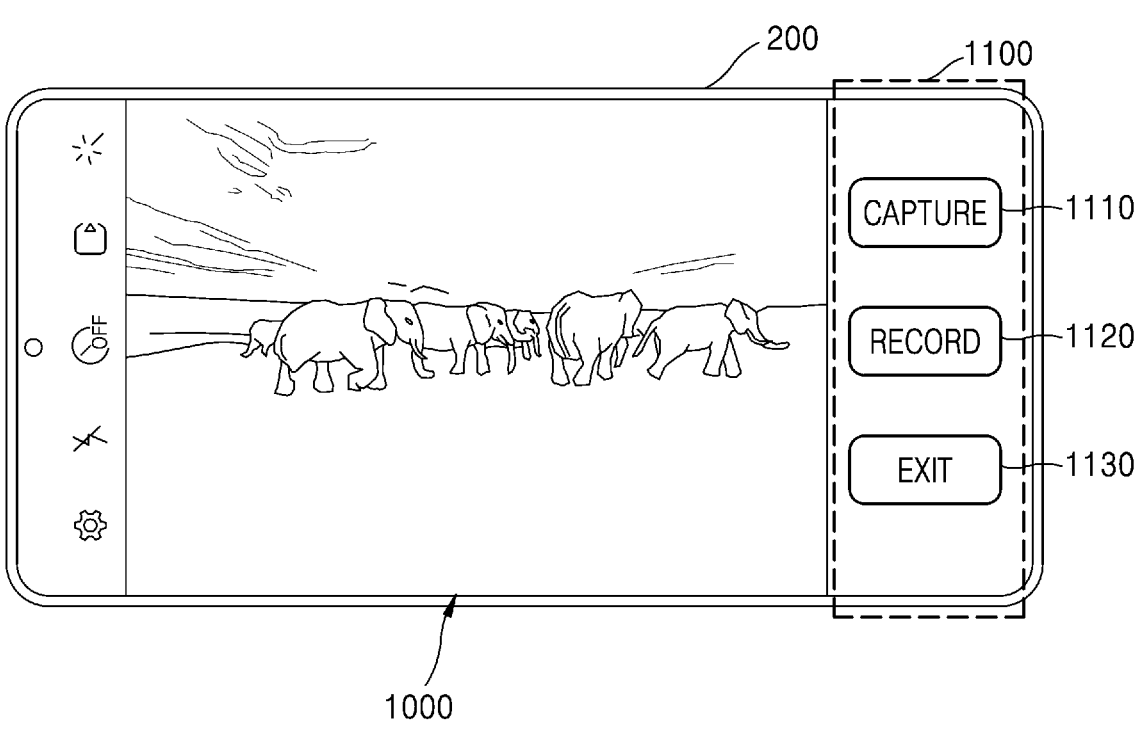
FIG. 11 is a diagram illustrating an example user interface that may be provided when an electronic device displays shared content, according to various embodiments.

FIG. 11 is a diagram illustrating an example user interface that may be provided when the electronic device 200 displays shared content, according to various embodiments.

Referring to FIG. 11, the electronic device 200 may display the shared content 1000 received from the display apparatus 100, and may provide a user interface 1100 for manipulating the shared content 1000.

According to an embodiment of the disclosure, the user interface 1100 may include a capture item 1110 for capturing the displayed shared content in units of images. As the capture item 1110 is selected, the electronic device 200 may capture and store an image of content displayed when the capture item 1110 is selected.

According to an embodiment of the disclosure, the user interface 1100 may include a record item 1120 for recording the displayed shared content as a video for a specified period of time. As the record item 1120 is selected, the electronic device 200 may store content from a time when the record item 1120 is selected to a time when the record item 1120 is deselected.

According to an embodiment of the disclosure, the user interface 1100 may include an exit item 1130 for ending displaying the shared content. As the exit item 1130 is selected, the electronic device 200 may end displaying the shared content and may return to a screen state before the shared content is displayed.

FIG. 12 is a signal flow diagram illustrating example methods of operating a display apparatus and an electronic device to share content, according to various embodiments. Although the electronic device 200 checks the display apparatus 100 and then automatically transmits a content sharing request signal in an example of FIG. 7, the electronic device 200 may check the display apparatus 100 and then may transmit a content sharing request signal according to a user's selection in an example of FIG. 12.

Referring to FIG. 12, operations 1201 to 1209 are the same as or similar to operations 701 to 709 of FIG. 7, and thus, a repeated description may not be provided.

In operation 1210, the electronic device 200 may provide a user interface for inquiring whether to capture content displayed on the display apparatus when the display apparatus is checked in operation 1209. Because a user attempts to capture an image of the display apparatus 100 by making a camera of the electronic device 200 face the display apparatus 100 in a previous operation, for example, operation 1202 or 1206, the electronic device 200 may determine that the user has an intention to capture the content displayed on the display apparatus 100. Accordingly, in FIG. 7, the electronic device 200 is configured to automatically transmit a content sharing request signal to the display apparatus immediately after the display apparatus is checked. However, in an example of FIG. 12, a user interface for checking the user's intention once again may be provided.

In operation 1211, the electronic device 200 may receive a user input that selects content capture.

In operation 1212, the electronic device 200 may transmit a signal for requesting to share the content to the display apparatus 100 based on the received user input.

Operations 1212 to 1214 are the same as or similar to operations 710 to 712 of FIG. 7, and thus, a repeated description may not be provided.

FIG. 13 is a diagram illustrating an example process in which an electronic device checks a user's intention to capture after checking a display apparatus, according to various embodiments.

Referring to FIG. 13, before the display apparatus is checked and the electronic device 200 sends a content sharing request to the display apparatus 100, the electronic device 200 may output a user interface 1300 for inquiring about a user's intention to capture content once again. The user interface 1300 may include a message saying, for example, "Do you want to capture or record the image? OK Cancel".

When the user selects <OK> in response to the user interface 1300, the electronic device 200 may transmit a content sharing request to the display apparatus 100, and when shared content is received from the display apparatus 100 according to the content sharing request, the electronic device 200 may display the received shared content 1000 on A display. When the user selects <Cancel> in response to the user interface 1300, the electronic device 200 may not transmit a content sharing request and may end the operation.

While video content is played, the display apparatus 100 may output, together with the video content, a notification message for notifying the user, an advertisement message, or a user interface for menu selection. The notification message may include a message indicating chat text notification of a chat service or email reception, a disaster alert text message, or an alert message such as a usage environment or status of the display apparatus 100. However, according to examples of the disclosure, because the display apparatus 100 transmits content to the electronic device 200 to enable the user to utilize the content displayed on the display apparatus 100, that is, video content that is main content, for personal use, the notification message may not be content wanted by the user. Accordingly, it may be preferable to prevent and/or reduce additional content other than the video content from being recorded or captured when the user records or captures the video content in the electronic device 200. Various examples of filtering content other than video content from among pieces of content displayed on the display apparatus 100 will be described in greater detail below with reference to FIGS. 14 to 19.

FIG. 14 is a signal flow diagram illustrating an example method by which an electronic device receives and processes shared content, according to various embodiments.

Referring to FIG. 14, in operation 1401, the electronic device 200 may transmit a content sharing request signal to the display apparatus 100. Operations 701 to 709 of FIG. 7 or operations 1201 to 1211 of FIG. 12 may be performed before operation 1401.

In operation 1402, the display apparatus 100 may receive the content sharing request signal, and may transmit sharing requested content to the electronic device 200. The display apparatus 100 may further display various additional content in addition to video content requested to be played by a user on a display screen. The content additionally displayed in addition to the video content may be referred to as graphic content or additional content. As described above, a notification message for notifying the user, an advertisement message, or a user interface for menu selection may be output as the additional content together with the video content. The notification message may include a message indicating chat text notification of a chat service or email reception, a disaster alert text message, or an alert message such as a usage environment or status of the display apparatus 100.

According to an embodiment of the disclosure, the display apparatus 100 may transmit both the video content and the additional content displayed on a display to the electronic device 200.

In operation 1403, the electronic device 200 may receive shared content including both the video content and the additional content, and may display the received video content and additional content on a display.

In operation 1404, the electronic device 200 may receive a user input that selects to record or capture the shared content.

In operation 1405, the electronic device 200 may recognize the additional content in the content displayed on the electronic device 200, and may perform an operation of recording or capturing only the video content excluding the additional content. According to this embodiment of the disclosure, the display apparatus 100 does not need to perform separate additional content processing in response to a content sharing request, and additional content filtering may be performed when the electronic device 200 receives a content manipulation command from the user.

FIG. 15 is a diagram illustrating an example where an electronic device performs filtering on additional content, according to various embodiments.

Referring to FIG. 15, while displaying video content 1510, the display apparatus 100 may further display additional content 1520 in addition to the video content 1510.

In response to a content sharing request of the electronic device 200, the display apparatus 100 may transmit shared content 1500 including both the video content 1510 and the additional content 1520 displayed on a display to the electronic device 200 according to content sharing technology.

The electronic device 200 may display the shared content 1500, that is, both the video content 1510 and the additional content 200, received from the display apparatus 100 on a display of the electronic device 200.

When the electronic device 200 receives a command to manipulate content displayed on the display of the electronic device 200, for example, a user input that selects either the capture item 1110 or the record item 1120, the electronic device 2100 may capture or record content displayed on the display in response to the user input. In this case, because the additional content 1520 is not likely to be content that a user wants to capture or record, the electronic device 200 may record or capture and store only the video content 1510 excluding the additional content 1520 among the content 1500 displayed on the display.

FIG. 16 is a signal flow diagram illustrating an example method by which an electronic device receives and processes shared content, according to various embodiments.

Referring to FIG. 16, in operation 1601, the electronic device 200 may transmit a content sharing request signal to the display apparatus 100. Operations 701 to 709 of FIG. 7 or operations 1201 to 1211 of FIG. 12 may be performed before operation 1601.

In operation 1602, the display apparatus 100 may receive a content sharing request, and may transmit sharing requested content to the electronic device 200. The display apparatus 100 may further display various additional content in addition to video content requested to be played by a user on a display screen. The content additionally displayed in addition to the video content may be referred to as graphic content or additional content. As described above, a notification message for notifying to the user, an advertisement message, or a user interface for menu selection may be output as the additional content together with the video content. The notification message may include a message indicating chat text notification of a chat service or email reception, a disaster alert text message, or an alert message such as a usage environment or status of the display apparatus 100.

According to an embodiment of the disclosure, the display apparatus 100 may transmit both the video content and the additional content displayed on a display to the electronic device 200.

In operation 1603, the electronic device 200 may receive shared content including both the video content and the additional content, may recognize the additional content in the received content, and may only the video content excluding the recognized additional content on a display.

In operation 1604, the electronic device 200 may receive a user input that selects to record or capture the shared content.

In operation 1605, the electronic device 200 may perform an operation of recording or capturing the content displayed on the electronic device 200. According to this embodiment of the disclosure, the display apparatus 100 does not need to perform separate additional content processing in response to a content sharing request, and additional content filtering may be performed when the electronic device 200 displays shared content.

FIG. 17 is a signal flow diagram illustrating an example method by which an electronic device receives and processes shared content, according to various embodiments.

Referring to FIG. 17, operation 1701 is the same as or similar to operation 1401 of FIG. 14 or operation 1601 of FIG. 16, and thus, a repeated description may not be provided.

In operation 1702, the display apparatus 100 may receive a content sharing request from the electronic device 200, and may recognize at least one of additional content or video content in content displayed on a display according to the content sharing request. That is, the display apparatus 100 may obtain the video content by recognizing the video content in the content displayed on the display, or may obtain the video content by recognizing the additional content in the content displayed on the display and filtering the additional content.

In operation 1703, the display apparatus 100 may transmit, to the electronic device 200, the video content excluding the additional content in the content displayed on the display as shared content.

In operation 1705, the electronic device 200 may receive the video content excluding the additional content and may display the received video content on a display.

In operation 1706, the electronic device 200 may receive a user input that selects to record or capture the shared content.

In operation 1707, the electronic device 200 may perform an operation of recording or capturing the content displayed on the electronic device 200. According to this embodiment of the disclosure, the electronic device 200 does not need to perform separate additional content processing, and additional content filtering may be performed before the display apparatus 100 transmits shared content.

FIG. 18 is a diagram illustrating an example where a display apparatus preforms filtering on additional content, according to various embodiments.

Referring to FIG. 18, while displaying the video content 1510, the display apparatus 100 may further display the additional content 1520 in addition to the video content 1510.

In response to a content sharing request of the electronic device 200, the display apparatus 100 may filter the additional content 1520 in the content 1500 including both the video content 1510 and the additional content 1520 displayed on a display, and may transmit only the video content 1510 to the electronic device 200 according to content sharing technology.

The electronic device 200 may display the shared content, that is, the video content 1510, received from the display apparatus 100 on a display of the electronic device 200.

When the electronic device 200 receives a command to manipulate content displayed on the display of the electronic device 200, for example, a user input that selects either the capture item 1110 or the record item 1120, the electronic device may capture or record the content displayed on the display in response to the user input.

FIG. 19 is a signal flow diagram illustrating an example method by which an electronic device transmits a content sharing request together with an additional content filtering request to a display apparatus, according to various embodiments.

Referring to FIG. 19, in operation 1901, when the electronic device 200 transmits a content sharing request to the display apparatus 100, the electronic device 200 may selectively include additional content filtering request information in the content sharing request signal and may transmit the content sharing request.

In operation 1902, the display apparatus 100 receiving the content sharing request in which the additional content filtering request information is selectively included may determine whether there is the additional content filtering request information in the content sharing request signal.

When it is determined that there is no additional content filtering request information, the display apparatus 100 may proceed to operation 1904.

In operation 1904, the display apparatus 100 may transmit content displayed on a display to the electronic device 200 without separate additional content filtering using content sharing technology.

When it is determined in operation 1902 that there is the additional content filtering request information, the display apparatus 100 may proceed to operation 1903.

In operation 1903, the display apparatus 100 may obtain only video content by filtering additional content in the content displayed on the display. In operation 1904, only the video content excluding the additional content may be transmitted as sharing requested content to the electronic device 200.

In operation 1905, the electronic device 200 may receive and display the shared content.

FIG. 20 is a signal flow diagram illustrating an example method of operating when an end command is received while an electronic device displays shared content, according to various embodiments.

Referring to FIG. 20, in operation 2001, the display apparatus 100 may transmit sharing requested content to the electronic device 200 in response to a content sharing request received from the electronic device 200.

In operation 2002, the electronic device 200 may display content requested to be shared and received from the display apparatus 100.

In operation 2003, the electronic device 200 may process the shared content according to a user input. For example, when a content record command is received, the electronic device 200 may record the content, and when a content capture command is received, the electronic device 200 may capture the content.

In operation 2004, the electronic device 200 may receive an exit command according to a user input. For example, the electronic device 200 may receive a user input that selects the exit item 1130 in the user interface 1100 as shown in FIG. 11. When a user wants to end displaying the shared content in the electronic device 200, the user may select the exit item 1130.

In operation 2005, the electronic device 200 may transmit a content sharing end request to the display apparatus 100.

Accordingly, in operation 2006, the display apparatus 100 may stop transmitting the sharing requested content.

In operation 2007, the electronic device 200 may end displaying the shared content when the exit item 1130 is selected, and may return to a screen before the shared content is displayed.

FIG. 21 is a diagram illustrating an example method by which an electronic device ends displaying shared content, according to various embodiments.

Referring to FIG. 21, the electronic device 200 may display shared content received from the display apparatus 100. The electronic device 200 may further display the user interface 1100 for controlling the shared content. When a user wishes to end displaying the shared content, the user may select the exit item 1130. The electronic device 200 may request the display apparatus 100 to stop transmitting the shared content when the exit item 1130 is selected. Also, the electronic device 200 may end displaying the shared content, and may return to a screen before the shared content is displayed, that is, to a screen displaying a preview image of a screen of the display apparatus when the user performs an operation of capturing an image of the screen of the display apparatus 100 using a camera application.

FIG. 22 is a signal flow diagram illustrating an example method operating an electronic device when playback of shared content in a display apparatus ends while an electronic device displays the shared content, according to various embodiments.

Referring to FIG. 22, in operation 2201, the display apparatus 100 may transmit sharing requested content to the electronic device 200 in response to a content sharing request received from the electronic device 200.

In operation 2202, the electronic device 200 may display content requested to be shared and received from the display apparatus 100.

In operation 2203, the electronic device 200 may process/control the shared content according to a user input. For example, when a content record command is received, the electronic device 200 may record the content, and when a content capture command is received, the electronic device 200 may capture the content.

In operation 2204, while the electronic device 200 displays the shared content, playback of the content in the display apparatus 100 may end. Playback of the content in the display apparatus 100 may end for any of various reasons. For example, displaying of the content in the display apparatus 100 may end according to a user input that ends playing the content in the display apparatus 100. For example, playback of the content may end when a playback time of the content played in the display apparatus 100 ends.

In operation 2205, the display apparatus 100 may stop transmitting the content when the playback of the content ends.

In operation 2206, when the transmitting of the content ends, the electronic device 200 may end displaying the shared content and may return to a screen before the shared content is displayed.

Figure 23:
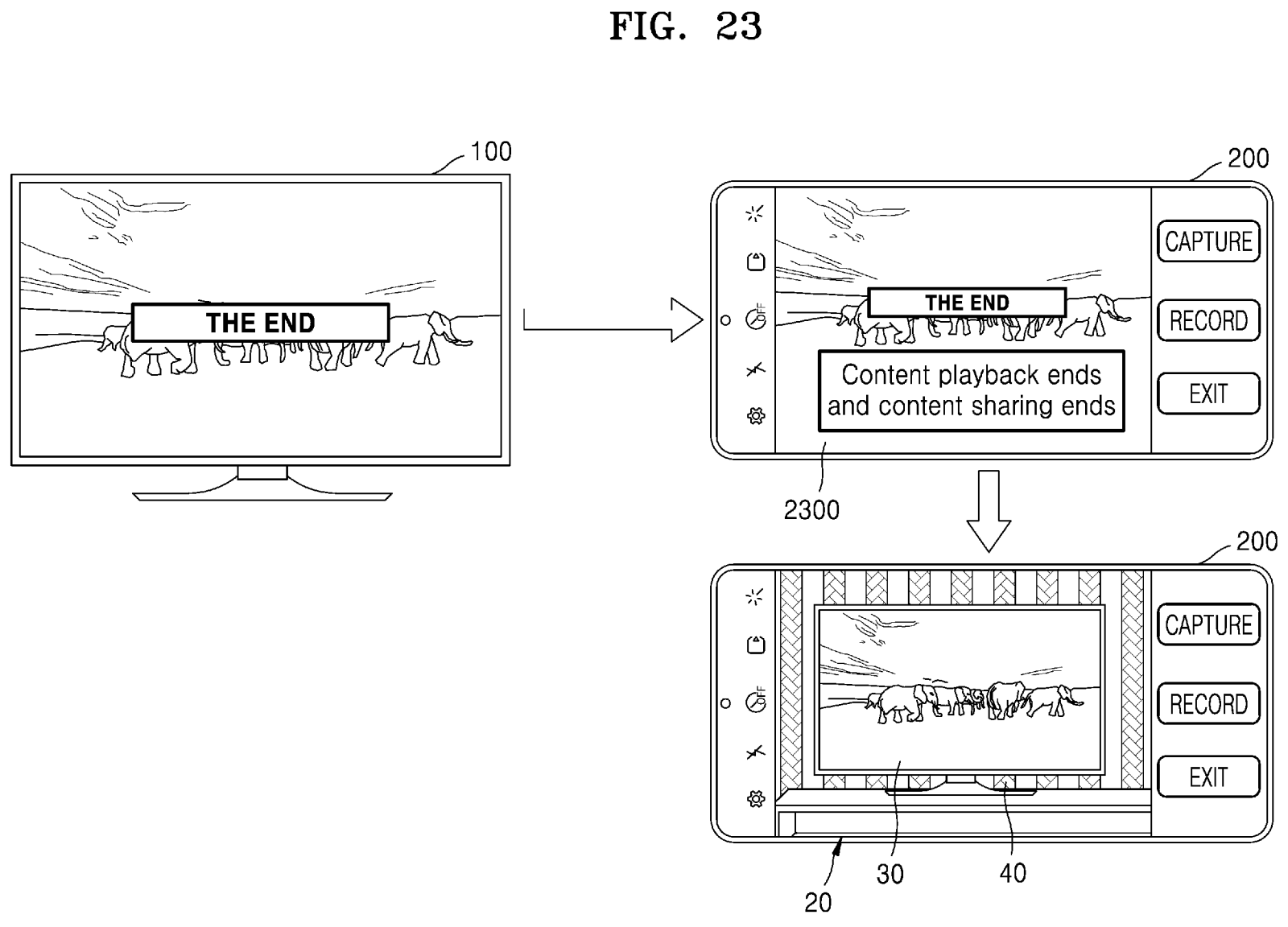

FIG. 23 is a diagram illustrating an example method by which an electronic device ends displaying shared content, according to various embodiments.

Referring to FIG. 23, playback of content in the display apparatus 100 may end while the electronic device 200 displays shared content received from the display apparatus 100. When playback of content in the display apparatus 100 ends and transmitting of the content is stopped, the electronic device 200 may end displaying the shared content, and may return to a screen before the shared content is displayed, that is, to a screen displaying a preview image of a screen of the display apparatus when a user performs an operation of capturing an image of the screen of the display apparatus 100 using a camera application. Also, when displaying of the shared content ends, the electronic device 200 may output a message indicating that displaying of the content ends, for example, text 2300 saying <Content playback ends and content sharing ends>.

Various embodiments of the disclosure may be implemented in the form of a non-transitory computer-readable recording medium that includes computer-executable instructions such as program modules executed by a computer. A computer-readable medium may be an arbitrary available medium accessible by a computer, and includes all volatile and non-volatile media and separable and non-separable media. The computer-readable medium may also include a computer storage medium. Examples of the computer storage medium include all volatile and non-volatile media and separable and non-separable media, which have been implemented by an arbitrary method or technology, for storing information such as computer-readable instructions, data structures, program modules, and other data.

Embodiments of the disclosure may be implemented as a software program including instructions stored in a non-transitory computer-readable storage medium.

The computer is a device capable of fetching instructions stored in a storage medium and operating according to the embodiments of the disclosure based on the instructions, and may include an electronic device according to the embodiments of the disclosure.

The computer-readable storage medium may be provided in the form of a non-transitory storage medium. Here, the 'non-transitory' storage medium does not include a signal and is tangible, but may not distinguish whether data is stored semi-permanently or temporarily in the storage medium.

Furthermore, control methods according to embodiments of the disclosure may be included and provided in a computer program product. The computer program product is a product purchasable between a seller and a purchaser.

The computer program product may include a software program and a computer-readable storage medium in which the software program is stored. For example, the computer program product may include a product in the form of a software program (e.g., a downloadable application) that is electronically distributed by a manufacturer of a device or by an electronic market (e.g., Google Play Store™, or App Store™). For electronic distribution, at least a portion of the software program may be stored in a storage medium or temporarily generated. In this case, the storage medium may be a storage medium of a server of the manufacturer, a server of the electronic market, or a relay server that temporarily stores the software program.

In a system including a server and a device, the computer program product may include a storage medium of the server or a storage medium of the device. Alternatively, when there is a third device (e.g., a smartphone) communicatively connected to the server or the device, the computer program product may include a storage medium of the third device. Alternatively, the computer program product may include a software program itself that is transmitted from the third party to the device, or transmitted from the serer to the device or the third device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an artificial intelligence (AI) server) may execute the computer program product stored therein to control the device communicatively connected to the server to perform the method according to the embodiments of the disclosure.

In yet another example, the third device may execute the computer program product to control the device communicatively connected to the third device to perform the method according to the embodiments of the disclosure. When the third device executes the computer program product, the third device may download the computer program product from the server and execute the downloaded computer program product. Alternatively, the third device may execute the computer program product that is preloaded to perform the method according to the embodiments of the disclosure.

Also, the term "unit" used herein may be a hardware component such as a processor or a circuit, and/or a software component executed by a hardware component such as a processor.

The above description of the disclosure is provided for illustration, and it will be understood by one of ordinary skill in the art that various changes in form and details may be readily made therein without departing from essential features and the scope of the disclosure as defined by the following claims. Accordingly, the above embodiments of the disclosure are examples only in all aspects and are not limited. For example, each component described as a single type may be implemented in a distributed manner, and similarly, components described as distributed may be implemented in a combined form. It will also be understood that any of the embodiment(s) described herein may be used in conjunction with any other embodiment(s) described herein.

The scope of the disclosure includes the appended claims, and all changes or modifications within the scope of the appended claims and their equivalents will be construed as being included in the scope of the disclosure.

What is claimed is:

1. A display apparatus comprising:
a display;
a communication unit comprising communication circuitry;
a memory in which one or more instructions are stored; and
a processor comprising processing circuitry and configured to execute the one or more instructions stored in the memory to:
identify whether content displayed on the display is sharable content,
based on the content having been identified as sharable content, control the communication unit to broadcast a signal comprising state information indicating that the content is sharable content,
based on the communication unit having broadcast the signal comprising state information indicating that the content is sharable content, control the communication unit to receive a content sharing request for sharing the sharable content from an electronic device, and
based on the communication unit having received the content sharing request for sharing the sharable content form the electronic device, control the communication unit to transmit at least part of the sharable content output to the display to the electronic device.

2. The display apparatus of claim 1, wherein the processor is further configured to execute the one or more instructions to identify that the content is sharable content by detecting that the content is game content.

3. The display apparatus of claim 1, wherein the processor is further configured to execute the one or more instructions to:

receive a identification request signal for identifying the display apparatus from the electronic device in response to the broadcast signal, provide identification response information indicating a response together with the content, in response to the identification request signal, and receive the content sharing request for sharing the content from the electronic device in response to the identification response information.

4. The display apparatus of claim 3, wherein the processor is further configured to execute the one or more instructions to invisibly provide the identification response information by embedding the identification response information in the content, or provide the identification response information to be visibly displayed in the content.

5. The display apparatus of claim 1, wherein the content sharing request comprises a first type sharing request and a second type sharing request, wherein the processor is further configured to execute the one or more instructions to:

based on receiving the first type sharing request, control the content other than additional content in data output to the display to be transmitted to the electronic device, and based on receiving the second type sharing request, control both the content and the additional content output to the display to be transmitted to the electronic device.

6. An electronic device comprising:

a display;

a communication unit comprising communication circuitry;

a memory in which one or more instructions are stored; and a processor comprising processing circuitry and configured to execute the one or more instructions stored in the memory to:

obtain an image of content being displayed on a screen of a display apparatus, through a camera of the electronic device, control the communication unit to receive a broadcast signal comprising state information indicating that the content displayed on the display apparatus is sharable content, based on the communication unit having received the broadcast signal comprising the state information indicating that the content displayed on the display apparatus is sharable content, identify whether the display apparatus displaying the image corresponds the display apparatus transmitting the broadcast signal, based on the display apparatus of the obtained image having been identified as the display apparatus transmitting the broadcast signal, control the communication unit to transmit a content sharing request for sharing the sharable content to the display apparatus, and based on the communication unit having transmitted the content sharing request for sharing the content to the display apparatus, control the communication unit to receive, from the display apparatus, at least a portion of the sharable content output to a display of the display apparatus.

7. The electronic device of claim 6, wherein the processor is further configured to execute the one or more instructions to:

detect an object representing the display apparatus from the obtained image, based on the broadcast signal, control the communication unit to transmit, to the display apparatus, a identification request signal for identifying the display apparatus, and identify the display apparatus by detecting identification response information from the object representing the display apparatus, in response to the identification request signal.

8. The electronic device of claim 7, wherein the processor is further configured to execute the one or more instructions to detect the identification response information being invisibly embedded in the content or detect the identification response information being visibly displayed on the content.

9. The electronic device of claim 6, wherein the processor is further configured to execute the one or more instructions to control the communication unit to transmit a first type of sharing request for requesting transmission of the content other than additional content in data output to the display to the electronic device, or a second type sharing request for requesting to transmit both the content and the additional content output to the display to the electronic device.

10. The electronic device of claim 6, wherein the processor is further configured to execute the one or more instructions to control the communication unit to automatically transmit the content sharing request to the display apparatus according to the identification of the display apparatus.

11. The electronic device of claim 6, wherein the processor is further configured to execute the one or more instructions to:

provide a user interface for selecting photographing of the content according to the identification of the display apparatus, and transmit the content sharing request for sharing the content to the display apparatus, based on a user input selecting photographing of the content being received in via the user interface.

12. The electronic device of claim 6, wherein the processor is further configured to execute the one or more instructions to:

control the display to display, the content received from the display apparatus according to the content sharing request, and record or capture the content displayed on the display according to a user input.

13. A method of operating a display apparatus, the method comprising identifying whether content displayed on a display is sharable content, based on the content having been identified as sharable content, broadcasting a signal comprising state information indicating that the content is sharable content, based on having broadcast the signal comprising state information indicating that the content is sharable content, receiving a content sharing request for sharing the sharable content from an electronic device, and based on having received the content sharing request for sharing the sharable content form the electronic device, transmitting at least part of the content output to the display to the electronic device.

14. The method of claim 13, further comprising receiving a identification request signal for identifying the display apparatus from the electronic device in response to the broadcast signal, providing identification response information indicating a response together with the content, in response to the identification request signal, and receiving the content sharing request for sharing the content from the electronic device in response to the identification response information.

15. The method of claim 14, further comprising invisibly providing the identification response information by embedding the identification response information in the content, or providing the identification response information to be visibly displayed on the content.

16. The method of claim 13, wherein the content sharing request comprises a first type sharing request and a second type sharing request, wherein the method further comprises, based on the first type sharing request being received, controlling content other than additional content in data output to the display to be transmitted to the electronic device, and based on the second type sharing request being received, controlling both the content and the additional content output to the display to be transmitted to the electronic device.

17. A method of operating an electronic device, the method comprising obtaining an image of content being displayed on a screen of a display apparatus, through a camera in the electronic device, receiving a broadcast signal comprising state information indicating that the content displayed on the display apparatus is sharable content, based on having received the broadcast signal comprising the state information indicating that the content displayed on the display apparatus is sharable content, identifying whether the display apparatus displaying the image corresponds to the display apparatus transmitting the broadcast signal, based on the display apparatus of the obtained image having been identified as the display apparatus transmitting the broadcast signal, transmitting a content sharing request for sharing the sharable content to the display apparatus, and based on the content sharing request for sharing the content to the display apparatus having been transmitted, receiving, from the display apparatus, at least part of the sharable content output to a display of the display apparatus.

18. The method of claim 17, further comprising detecting an object representing the display apparatus from the obtained image, based on the broadcast signal, transmitting, to the display apparatus, a identification request signal for identifying the display apparatus, and identifying the display apparatus by detecting identification response information from the object representing the display apparatus in response to the identification request signal.

19. The method of claim 17, further comprising transmitting a first type sharing request for requesting to transmit content other than additional content in data output to the display to the electronic device, or a second type sharing request for requesting to transmit both the content and the additional content output to the display to the electronic device.

20. A non-transitory computer-readable recording medium having recorded thereon at least one program executable by a processor of a display apparatus to perform an operating method of the display apparatus, wherein the operating method of the display apparatus comprises identifying whether content displayed on a display is sharable content, based on the content having been identified as sharable content, broadcasting a signal comprising state information indicating that the content is sharable content, based on having broadcast the signal comprising state information indicating that the content is sharable content, receiving a content sharing request for sharing the sharable content from an electronic device-based on the broadcast signal, and based on having received the content sharing request for sharing the sharable content form the electronic device, transmitting at least part of the content output to the display to the electronic device.

* * * * *